(12) United States Patent
Sugiura et al.

(10) Patent No.: US 7,576,139 B2
(45) Date of Patent: Aug. 18, 2009

(54) COATING COMPOSITION AND METHOD OF FORMING COATING FILM

(75) Inventors: Kazutoshi Sugiura, Hiratsuka (JP); Hiromi Katoh, Hiratsuka (JP); Yoshizumi Matsuno, Hiratsuka (JP)

(73) Assignee: Kansai Paint Co., Ltd., Amagasaki-Shi (JP)

( * ) Notice: Subject to any disclaimer, the term of this patent is extended or adjusted under 35 U.S.C. 154(b) by 78 days.

(21) Appl. No.: 10/572,283

(22) PCT Filed: Sep. 30, 2004

(86) PCT No.: PCT/JP2004/014782
§ 371 (c)(1), (2), (4) Date: Mar. 16, 2006

(87) PCT Pub. No.: WO2005/030890
PCT Pub. Date: Apr. 7, 2005

(65) Prior Publication Data
US 2007/0054977 A1    Mar. 8, 2007

(30) Foreign Application Priority Data
Sep. 30, 2003   (JP) ............................. 2003-340660

(51) Int. Cl.
*C08F 2/50* (2006.01)
*C08J 3/28* (2006.01)

(52) U.S. Cl. ............... 522/107; 522/109; 522/110; 522/111; 522/112; 522/150; 522/152; 522/153; 522/154; 522/165; 522/173; 522/175; 522/178; 522/182; 524/800; 106/287.21; 106/287.26

(58) Field of Classification Search ............... 522/107, 522/174; 524/800; 106/287.21, 287.26
See application file for complete search history.

(56) References Cited

U.S. PATENT DOCUMENTS

| | | | | |
|---|---|---|---|---|
| 4,066,523 A | | 1/1978 | McGinniss | 204/159 |
| 4,349,651 A | * | 9/1982 | Smith | 526/263 |
| 4,371,689 A | * | 2/1983 | Gaku et al. | 528/162 |
| 4,383,903 A | * | 5/1983 | Ayano et al. | 522/11 |
| 6,410,611 B1 | | 6/2002 | Sakurai et al. | 522/103 |
| 6,465,589 B2 | | 10/2002 | Inukai et al. | 526/262 |
| 6,774,173 B2 | * | 8/2004 | Kato et al. | 524/513 |
| 2001/0003764 A1 | * | 6/2001 | Inukai et al. | 524/548 |
| 2002/0128379 A1 | * | 9/2002 | Hasegawa et al. | 524/801 |
| 2003/0065068 A1 | * | 4/2003 | Inukai et al. | 524/104 |
| 2003/0125460 A1 | * | 7/2003 | Kato et al. | 525/30 |
| 2003/0176568 A1 | * | 9/2003 | Onoda et al. | 524/589 |
| 2005/0074563 A1 | * | 4/2005 | Tatsuzawa et al. | 428/1.1 |

FOREIGN PATENT DOCUMENTS

| | | |
|---|---|---|
| EP | 0381899 A2 * | 12/1989 |
| EP | 0878482 | 11/1998 |
| EP | 1106659 | 6/2001 |
| EP | 1300429 A1 * | 4/2003 |
| EP | 1321930 | 6/2003 |
| JP | 2-102275 | 4/1990 |
| JP | 11-124403 | 5/1999 |
| JP | 11-124404 | 5/1999 |
| JP | 2001-163925 | 6/2001 |
| JP | 2001-220536 | 8/2001 |
| JP | 2001-279165 | 10/2001 |
| JP | 2002-320910 | 11/2002 |
| JP | 2003-96388 | 4/2003 |
| WO | WO 03/052813 | 6/2003 |

OTHER PUBLICATIONS

European Search Report dated May 10, 2007.

* cited by examiner

*Primary Examiner*—Sanza L McClendon
(74) *Attorney, Agent, or Firm*—Kratz, Quintos & Hanson, LLP

(57) ABSTRACT

The present invention provides a thermosetting and photocurable coating composition obtained by incorporating a copolymer of a maleimide group-containing monomer with other monomer(s) or a specific maleimide compound into a composition comprising a hydroxyl-containing resin and a curing agent and optionally containing an unsaturated compound; and a method of forming a coating film using the coating composition.

11 Claims, No Drawings

COATING COMPOSITION AND METHOD OF FORMING COATING FILM

TECHNICAL FIELD

The present invention relates to a coating composition and a method of forming a coating film.

BACKGROUND ART

For the formation of a coating film on the bodies of vehicles such as automobiles, motorcycles, and the like, one widely used method comprises applying a thermosetting coating composition that contains a resin having thermosetting functional groups, such as a hydroxyl-containing acrylic resin, and a curing agent, such as a melamine resin, to a vehicle body to be coated, and thereafter curing the applied coating composition by heating. This method can form a coating film having excellent film properties in terms of gasoline resistance, adhesion, etc.

In recent years, it has been desired to reduce energy consumption and increase productivity in the above-mentioned coating film formation method. For example, the heat-curing step on an automobile body coating line is usually conducted at about 140° C. for about 40 minutes; when the conveyor runs at a speed of 3 m/min, the step requires a space for the drying furnace line about 120 m in length. Therefore, in order to save space and energy, shortening of the heating time in the heat-curing step is demanded. Moreover, reduction of the heating time is preferable so as to decrease $CO_2$, soot, etc., which cause environmental problems.

In addition, in view of better appearance, the coating film formed on an automobile body is now increasingly required to have improved resistance to marring by car washes, scratching around keyholes, etc. It has thus become important to develop a coating composition that can form a coating film having excellent resistance to marring or scratching on an automobile body or the like.

Use of coating compositions that are curable by active energy rays such as ultraviolet rays is effective for reducing or omitting heating steps. For example, Japanese Unexamined Patent Publications No. 1999-124403 and No. 1999-124404 disclose an active energy ray-curable composition comprising a maleimide derivative that can be cured under ultraviolet irradiation. However, although coating with such a composition can shorten the time to cure a coating film or can reduce the size of coating facilities, the curing of the coating film is insufficient, so that it is difficult to obtain a coating film having excellent properties in mar resistance, scratch resistance, gasoline resistance, adhesion, etc.

Japanese Unexamined Patent Publications No. 2001-220536 and No. 2002-320910 disclose an active energy ray-curable coating composition comprising an acrylic resin wherein the acrylic resin is a copolymer of a (meth)acrylic acid alkyl ester, a (meth)acrylic acid hydroxyalkyl ester, and a monomer having an unsaturated double bond and a maleimide group; and a coating method using this coating composition. However, although such a coating composition or coating method can shorten the time to cure a coating film or can reduce the size of coating facilities, the curing of the coating film is insufficient. As a result, no coating films can be obtained that are suitable for the bodies of automobiles, etc., having excellent properties in mar resistance, scratch resistance, gasoline resistance, adhesion, etc.

DISCLOSURE OF THE INVENTION

An object of the present invention is to provide a coating composition that enables shortening of the heating time for forming a cured coating film, thereby contributing to saving space and energy as well as reducing $CO_2$ and other agents of environmental damage; and that forms a coating film having excellent properties in terms of mar resistance, scratch resistance, gasoline resistance, adhesion, etc.

Another object of the invention is to provide a method of forming a coating film using the above coating composition.

Further objects and features of the invention will be apparent from the following description.

In order to achieve the above objects, the present inventors conducted extensive research. As a result, the inventors found that the above objects can be achieved by a thermosetting and photocurable coating composition obtained by incorporating a copolymer of a maleimide group-containing monomer with other monomer(s) or a specific maleimide compound into a composition comprising a hydroxyl-containing resin and a curing agent and optionally containing an unsaturated compound. Based on such novel findings, the inventors accomplished the present invention.

The present invention provides the following coating compositions and methods of forming a coating film using such coating compositions:

Item 1: A thermosetting and photocurable coating composition comprising:
(A) a hydroxyl-containing resin;
(B) a maleimide group-containing copolymer obtained by radical copolymerization of a maleimide group-containing monomer (a) with at least one other monomer;
(C) a curing agent; and
(D) at least one unsaturated compound selected from the group consisting of radical polymerizable unsaturated monomers, radical polymerizable unsaturated group-containing resins, and radical polymerizable unsaturated group- and thermosetting functional group-containing resins.

Item 2: A coating composition according to item 1, wherein the hydroxyl-containing resin (A) is a hydroxyl-containing polyester resin produced by esterifying a polybasic acid (b) with a polyhydric alcohol (c), wherein an alicyclic polybasic acid (b1) and/or an alicyclic polyhydric alcohol (c1) are included in a proportion of 20% or more by weight based on the total weight of polybasic acid (b) and polyhydric alcohol (c).

Item 3: A coating composition according to item 1, wherein the maleimide group-containing monomer (a) used for obtaining the copolymer (B) is a tetrahydrophthalmaleimide (meth)acrylate represented by formula (1):

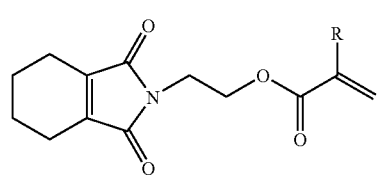

wherein R represents hydrogen atom or methyl group.

Item 4: A coating composition according to item 1, wherein the curing agent (C) is a polyisocyanate compound.

Item 5: A coating composition according to item 1, wherein the curing agent (C) is a combination of a polyisocyanate compound and a melamine resin.

Item 6: A coating composition according to item 1, comprising 20% to 60% by weight of hydroxyl-containing resin (A), 10% to 45% by weight of copolymer (B), and 5% to 50% by weight of curing agent (C) based on the total weight of hydroxyl-containing resin (A), copolymer (B), and curing agent (C); and comprising 1 to 50 parts by weight of unsaturated compound (D) per 100 parts by weight of the total of hydroxyl-containing resin (A), copolymer (B), and curing agent (C).

Item 7: A coating composition according to item 1, further comprising 0.1 to 20 parts by weight of photopolymerization initiator (F) per 100 parts by weight of the total of hydroxyl-containing resin (A), copolymer (B), and curing agent (C).

Item 8: A coating composition according to item 1, wherein the coating composition is a clear coating composition for automobile bodies or automobile body parts.

Item 9: A thermosetting and photocurable coating composition comprising:
(A) a hydroxyl-containing resin;
(C) a curing agent; and
(E) a maleimide compound represented by formula (2):

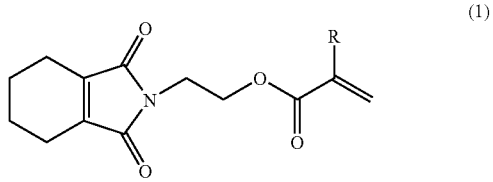

wherein m is an integer from 1 to 6, n is an integer from 1 to 17, and the maleimide compound (E) has a number average molecular weight of 2,000 or less.

Item 10: A coating composition according to item 9, wherein the hydroxyl-containing resin (A) is a hydroxyl-containing polyester resin produced by esterifying a polybasic acid (b) with a polyhydric alcohol (c), wherein an alicyclic polybasic acid (b1) and/or an alicyclic polyhydric alcohol (c1) are included in a proportion of 20% or more by weight based on the total weight of polybasic acid (b) and polyhydric alcohol (c).

Item 11: A coating composition according to item 9, wherein the curing agent (C) is a polyisocyanate compound.

Item 12: A coating composition according to item 9, wherein the curing agent (C) is a combination of a polyisocyanate compound and a melamine resin.

Item 13: A coating composition according to item 9, comprising 60% to 90% by weight of hydroxyl-containing resin (A) and 10% to 40% by weight of curing agent (C) based on the total weight of hydroxyl-containing resin (A) and curing agent (C); and comprising 1 to 50 parts by weight of maleimide compound (E) per 100 parts by weight of the total of hydroxyl-containing resin (A) and curing agent (C).

Item 14: A coating composition according to item 9, further comprising, per 100 parts by weight of the total of hydroxyl-containing resin (A) and curing agent (C), 1 to 50 parts by weight of at least one unsaturated compound (D) selected from the group consisting of radical polymerizable unsaturated monomers, radical polymerizable unsaturated group-containing resins, and radical polymerizable unsaturated group- and thermosetting functional group-containing resins.

Item 15: A coating composition according to item 9, further comprising 0.1 to 20 parts by weight of photopolymerization initiator (F) per 100 parts by weight of the total of hydroxyl-containing resin (A) and curing agent (C).

Item 16: A coating composition according to item 9, wherein the coating composition is a clear coating composition for automobile bodies or automobile body parts.

Item 17: A thermosetting and photocurable coating composition comprising:
(A) a hydroxyl-containing resin;
(B) a maleimide group-containing copolymer obtained by radical copolymerization of a maleimide group-containing monomer (a) with at least one other monomer;
(C) a curing agent; and
(E) a maleimide compound represented by formula (2):

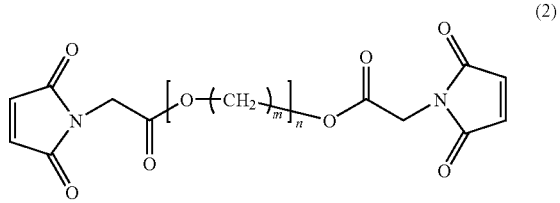

wherein m is an integer from 1 to 6, n is an integer from 1 to 17, and the maleimide compound (E) has a number average molecular weight of 2,000 or less.

Item 18: A coating composition according to item 17, wherein the hydroxyl-containing resin (A) is a hydroxyl-containing polyester resin produced by esterifying a polybasic acid (b) with a polyhydric alcohol (c), wherein an alicyclic polybasic acid (b1) and/or an alicyclic polyhydric alcohol (c1) are included in a proportion of 20% or more by weight based on the total weight of polybasic acid (b) and polyhydric alcohol (c).

Item 19: A coating composition according to item 17, wherein the maleimide group-containing monomer (a) of the copolymer (B) is a tetrahydrophthalmaleimide (meth)acrylate represented by formula (1):

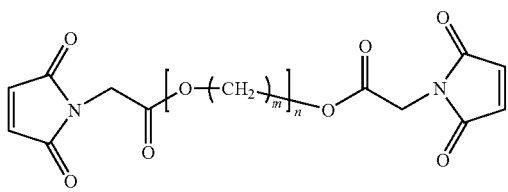

wherein R represents hydrogen atom or methyl group.

Item 20: A coating composition according to item 17, wherein the curing agent (C) is a polyisocyanate compound.

Item 21: A coating composition according to item 17, wherein the curing agent (C) is a combination of a polyisocyanate compound and a melamine resin.

Item 22: A coating composition according to item 17, comprising 20% to 60% by weight of hydroxyl-containing resin (A), 10% to 45% by weight of copolymer (B), and 5% to 50% by weight of curing agent (C) based on the total weight of hydroxyl-containing resin (A), copolymer (B), and curing agent (C); and comprising 1 to 50 parts by weight of maleimide compound (E) per 100 parts by weight of the total of hydroxyl-containing resin (A), copolymer (B), and curing agent (C).

Item 23: A coating composition according to item 17, further comprising, per 100 parts by weight of the total of hydroxyl-containing resin (A), copolymer (B), and curing agent (C), 1 to 50 parts by weight of at least one unsaturated compound (D) selected from the group consisting of radical polymerizable unsaturated monomers, radical polymerizable unsaturated group-containing resins, and radical polymerizable unsaturated group- and thermosetting functional group-containing resins.

Item 24: A coating composition according to item 17, further comprising 0.1 to 20 parts by weight of photopolymerization initiator (F) per 100 parts by weight of the total of hydroxyl-containing resin (A), copolymer (B), and curing agent (C).

Item 25: A coating composition according to item 17, wherein the coating composition is a clear coating composition for automobile bodies or automobile body parts.

Item 26: A method of forming a coating film comprising forming one or two colored base coats and one or two clear coats on a substrate to be coated to form a multilayer coating film, the top clear coat being formed from the coating composition of item 1.

Item 27: A method of forming a coating film according to item 26, wherein a colored base coat and a top clear coat are formed on the substrate to form a multilayer coating film.

Item 28: A method of forming a coating film according to item 26, wherein a colored base coat, a clear coat, and a top clear coat are formed on the substrate to form a multilayer coating film.

Item 29: A method of forming a coating film according to item 26, wherein a first colored base coat, a second colored base coat, and a top clear coat are formed on the substrate to form a multilayer coating film.

Item 30: A method of forming a coating film according to item 26, wherein the substrate is an automobile body or an automobile body part.

Item 31: An automobile body or an automobile body part having a coating film formed thereon by the method of forming a coating film according to item 30.

Item 32: A method of forming a coating film comprising forming one or two colored base coats and one or two clear coats on a substrate to be coated to form a multilayer coating film, the top clear coat being formed from the coating composition of item 9.

Item 33: A method of forming a coating film according to item 32, wherein a colored base coat and a top clear coat are formed on the substrate to form a multilayer coating film.

Item 34: A method of forming a coating film according to item 32, wherein a colored base coat, a clear coat, and a top clear coat are formed on the substrate to form a multilayer coating film.

Item 35: A method of forming a coating film according to item 32, wherein a first colored base coat, a second colored base coat, and a top clear coat are formed on the substrate to form a multilayer coating film.

Item 36: A method of forming a coating film according to item 32, wherein the substrate is an automobile body or an automobile body part.

Item 37: An automobile body or an automobile body part having a coating film formed thereon by the method of forming a coating film according to item 36.

Item 38: A method of forming a coating film comprising forming one or two colored base coats and one or two clear coats on a substrate to be coated to form a multilayer coating film, the top clear coat being formed from the coating composition of item 17.

Item 39: A method of forming a coating film according to item 38, wherein a colored base coat and a top clear coat are formed on the substrate to form a multilayer coating film.

Item 40: A method of forming a coating film according to item 38, wherein a colored base coat, a clear coat, and a top clear coat are formed on the substrate to form a multilayer coating film.

Item 41: A method of forming a coating film according to item 38, wherein a first colored base coat, a second colored base coat, and a top clear coat are formed on the substrate to form a multilayer coating film.

Item 42: A method of forming a coating film according to item 38, wherein the substrate is an automobile body or an automobile body part.

Item 43: An automobile body or an automobile body part having a coating film formed thereon by the method of forming a coating film according to item 42.

Thermosetting and Photocurable Coating Composition

The thermosetting and photocurable coating composition of the present invention can be obtained by incorporating (B) a copolymer of a maleimide group-containing monomer (a) with other monomer(s) or (E) a specific maleimide compound into a composition comprising (A) a hydroxyl-containing resin and (C) a curing agent and optionally containing (D) an unsaturated compound.

The coating composition of the present invention can be classified into thermosetting and photocurable coating composition (I), thermosetting and photocurable coating composition (II), and thermosetting and photocurable coating composition (III) as follows:

Thermosetting and Photocurable Coating Composition (I)

Thermosetting and photocurable coating composition (I) comprises: (A) a hydroxyl-containing resin; (B) a maleimide group-containing copolymer obtained by radical copolymerization of a maleimide group-containing monomer (a) with at least one other monomer; (C) a curing agent; and (D) at least one unsaturated compound selected from the group consisting of radical polymerizable unsaturated monomers, radical polymerizable unsaturated group-containing resins, and radical polymerizable unsaturated group- and thermosetting functional group-containing resins.

Hydroxyl-Containing Resin (A)

Hydroxyl-containing resin (A) contains two or more hydroxyl groups per molecule. The resin (A) may optionally contain carboxyl group(s). Examples of such resins (A) include hydroxyl-containing polyester resins, hydroxyl-containing acrylic resins, etc.

Hydroxyl-containing polyester resins are produced by esterifying polybasic acid(s) (b) and polyhydric alcohol(s) (c) by standard methods. Such esterification may be carried out by direct esterification methods and transesterification methods.

Examples of polybasic acids (b) include dibasic acids such as phthalic anhydride, isophthalic acid, terephthalic acid, cyclohexane-1,3-dicarboxylic acid, cyclohexane-1,4-dicarboxylic acid, hexahydrophthalic acid, hexahydroisophthalic acid, hexahydroterephthalic acid, hexahydrotrimellitic acid, tetrahydrophthalic acid, methyl hexahydrophthalic acid, tetrahydrophthalic anhydride, hexahydrophthalic anhydride, succinic acid, fumaric acid, adipic acid, sebacic acid, maleic anhydride, etc.; lower alkyl esters of dibasic acids; tribasic or higher polybasic acids such as trimellitic anhydride, methylcyclohexane tricarboxylic acid, pyromellitic anhydride, etc.; and so on.

Of the above polybasic acids (b), alicyclic polybasic acids (b1) are preferable. It is preferable to use alicyclic polybasic acids (b1) having one or two 4- to 6-membered rings or like alicyclic structures and two or more carboxyl groups per molecule. Examples of alicyclic polybasic acids (b1) include cyclohexane-1,3-dicarboxylic acid, cyclohexane-1,4-dicarboxylic acid, hexahydrophthalic acid, hexahydroisophthalic acid, hexahydroterephthalic acid, hexahydrotrimellitic acid, tetrahydrophthalic acid, methyl hexahydrophthalic acid; anhydrides of these acids; etc. Of such alicyclic polybasic acids, cyclohexane-1,4-dicarboxylic acid is especially preferable.

One or more polybasic acids selected from the above dibasic acids and lower alkyl esters thereof are mainly used as the polybasic acid (b), with tribasic or higher polybasic acids being optionally used. If necessary, the above polybasic acids may be used in combination with monobasic acids such as benzoic acid, crotonic acid, p-t-butylbenzoic acid, etc. for molecular weight adjustment, etc. Oil fatty acids such as coconut oil fatty acid, dehydrated castor oil fatty acid, etc. may also be used.

Usable polyhydric alcohols (c) include dihydric alcohols, which have two hydroxyl groups per molecule, and polyhydric alcohols having three or more hydroxyl groups per molecule.

Examples of dihydric alcohols include glycols such as ethylene glycol, propylene glycol, diethylene glycol, trimethylene glycol, tetraethylene glycol, triethylene glycol, dipropylene glycol, 1,4-butanediol, 1,3-butanediol, 2,3-butanediol, 1,2-butanediol, 3-methyl-1,2-butanediol, 1,2-pentanediol, 1,5-pentanediol, 1,4-pentanediol, 2,4-pentanediol, 2,3-dimethyltrimethylene glycol, tetramethylene glycol, 3-methyl-4,5-pentanediol, 2,2,4-trimethyl-1,3-pentanediol, 1,6-hexanediol, 1,5-hexanediol, 1,4-hexanediol, 2,5-hexanediol, neopentyl glycol, hydroxypivalic acid neopentyl glycol ester, etc.; polylactone diols obtained by the addition of lactones such as ε-caprolactone or the like to such glycols; polyester diols such as bis(hydroxyethyl) terephthalate, etc.; alicyclic dihydric alcohols such as cyclohexane-1,4-dimethylol, hydrogenated bisphenol-A, spiroglycol, dihydroxymethyltricyclodecane, etc.; and so on.

Examples of polyhydric alcohols having three or more hydroxyl groups per molecule include glycerin, trimethylolpropane, trimethylolethane, diglycerin, triglycerin, 1,2,6-hexanetriol, pentaerythritol, dipentaerythritol, sorbitol, mannitol, etc.

Of the above polyhydric alcohols (c), alicyclic polyhydric alcohols (c1) are preferable. It is preferable to use alicyclic polyhydric alcohols having one or two 4- to 6-membered rings or like alicyclic structures and two or more hydroxyl groups per molecule. Examples of alicyclic polyhydric alcohols (c1) include cyclohexane-1,4-dimethylol, hydrogenated bisphenol-A, spiroglycol, dihydroxymethyltricyclodecane, etc. Of such alicyclic polyhydric alcohols, cyclohexane-1,4-dimethylol is especially preferable.

In the preparation of a polyester resin, the polybasic acid(s) (b) and the polyhydric alcohol(s) (c) include at least one member selected from the group consisting of alicyclic polybasic acids (b1) and alicyclic polyhydric alcohols (c1) in a proportion of about 20% or more by weight, preferably about 30% to about 70% by weight, and more preferably about 40% to about 65% by weight, based on the total solids weight of polybasic acid(s) (b) and polyhydric alcohol(s) (c). The use of the polyester resin thus produced contributes to further improvement of coating film properties in terms of mar resistance (including resistance to marring by car washes), scratch resistance, etc.

The hydroxyl-containing polyester resin preferably has a weight average molecular weight of about 500 to about 500,000, more preferably about 1,000 to about 100,000, and even more preferably about 2,000 to about 50,000. The hydroxyl-containing polyester resin preferably has a hydroxyl value of about 20 to about 800 mg KOH/g, and more preferably about 80 to about 200 mg KOH/g. The hydroxyl-containing polyester resin preferably has an acid value of about 4 to about 200 mg KOH/g, and more preferably about 4 to about 100 mg KOH/g.

Hydroxyl-containing acrylic resins are copolymer resins obtained by radical copolymerization of a hydroxyl-containing acrylic monomer with other monomer(s).

A hydroxyl-containing monomer is a compound having one or more hydroxyl groups and one or more polymerizable unsaturated bonds per molecule. Examples of such monomers include monoesterification products of glycols having 2 to 20 carbon atoms with (meth)acrylic acid, such as hydroxyethyl(meth)acrylate, hydroxypropyl(meth)acrylate, hydroxybutyl(meth)acrylate, etc.

Examples of monomers other than hydroxyl-containing monomers include $C_{1-22}$ alkyl esters of (meth)acrylic acid, $C_{2-18}$ alkoxyalkyl esters of (meth)acrylic acid, amino acrylic monomers, acrylamide monomers, epoxy-containing monomers, carboxyl-containing monomers, monomers having both isocyanate group(s) and polymerizable unsaturated group(s) in the same molecule, etc.

Examples of $C_{1-22}$ alkyl esters of (meth)acrylic acid include methyl(meth)acrylate, ethyl(meth)acrylate, propyl (meth)acrylate, butyl(meth)acrylate, hexyl(meth)acrylate, octyl(meth)acrylate, lauryl(meth)acrylate, 2-ethylhexyl (meth)acrylate, cyclohexyl(meth)acrylate, isobornyl(meth) acrylate, etc.

Examples of $C_{2-18}$ alkoxyalkyl esters of (meth)acrylic acid include methoxybutyl(meth)acrylate, methoxyethyl(meth) acrylate, etc.

Examples of amino acrylic monomers include N,N-dimethylaminoethyl(meth)acrylate, N,N-diethylaminoethyl (meth)acrylate, N-t-butylaminoethyl(meth)acrylate, N,N-dimethylaminopropyl(meth)acrylate, etc.

Examples of acrylamide monomers include acrylamide, methacrylamide, N-methylacrylamide, N-methylmethacrylamide, N-ethylacrylamide, N-ethylmethacrylamide, N-butylacrylamide, N-butylmethacrylamide, N,N-dimethylacrylamide, N,N-dimethylmethacrylamide, etc.

Examples of epoxy-containing monomers include glycidyl acrylate, glycidyl methacrylates, etc.

Examples of carboxyl-containing monomers include acrylic acid, methacrylic acid, maleic acid, itaconic acid, fumaric acid, and mesaconic acid; anhydrides and half-esterification products of these; etc.

Examples of monomers having both isocyanate group(s) and polymerizable unsaturated group(s) in the same molecule include isocyanate ethyl methacrylate, m-isopropenyl-α,α'-dimethylbenzyl isocyanate (commonly referred to as m-TMI), etc.

Further examples of monomers other than hydroxyl-containing monomers include styrene, α-methylstyrene, vinyltoluene, acrylonitrile, vinyl acetate, vinyl chloride, "Veova 9" and "Veova 10" (trade names; products of Japan Epoxy Resins Co., Ltd.; unsaturated vinylation products of versatic acid), etc.

Such monomers other than hydroxyl-containing monomers may be used singly or in combination of two or more.

The hydroxyl-containing acrylic resin preferably has a number average molecular weight of about 1,000 to about 50,000, and more preferably about 2,000 to about 20,000. The hydroxyl-containing acrylic resin preferably has a hydroxyl value of about 20 to about 200 mg KOH/g, and more preferably about 50 to about 150 mg KOH/g.

Maleimide Group-Containing Copolymer (B)

The copolymer (B) is a maleimide group-containing copolymer obtained by radical copolymerization of a maleimide group-containing monomer (a) with one or more other monomers.

The maleimide group-containing monomer (a) preferably has a polymerizable unsaturated group and a maleimide group represented by formula (3):

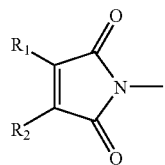

(3)

wherein $R_1$ and $R_2$ each independently represent hydrogen or an alkyl group having 4 or less carbon atoms, or $R_1$ and $R_2$ may be linked together to form a 5- or 6-membered hydrocarbon ring.

Examples of alkyl groups having 4 or less carbon atoms represented by $R_1$ and $R_2$ include methyl, ethyl, propyl, isopropyl, n-butyl, sec-butyl, tert-butyl, etc. Examples of the 5- or 6-membered hydrocarbon rings wherein $R_1$ and $R_2$ are linked together include cyclopentyl rings, cyclohexyl rings, etc.

A particularly preferable maleimide group-containing monomer (a) is the maleimide(meth)acrylate represented by formula (4):

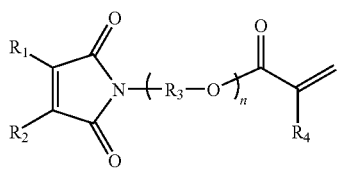

(4)

wherein $R_1$ and $R_2$ are as defined above; $R_3$ represents an optionally branched alkylene group or optionally branched alkenylene group; $R_4$ represents hydrogen atom or methyl group; and n is an integer from 1 to 6.

Preferable examples of the optionally branched alkylene group represented by $R_3$ include lower alkylene groups having 2 to 4 carbon atoms, such as ethylene, trimethylene, propylene, etc. Preferable examples of the optionally branched alkenylene group represented by $R_3$ include lower alkenylene groups having 2 to 4 carbon atoms, such as vinylene, propenylene, vinylidene, etc.

Of the monomers represented by formula (4), the tetrahydrophthalmaleimide(meth)acrylate represented by formula (1):

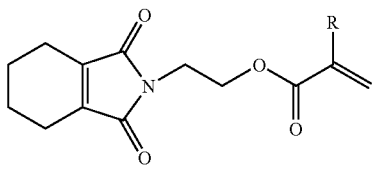

(1)

wherein R represents hydrogen atom or methyl group, is especially preferable for improving the mar resistance (including resistance to marring by car washes), scratch resistance, gasoline resistance, adhesion, and other coating film properties of a composition using the resulting copolymer (B).

Examples of monomers other than maleimide group-containing monomer (a) include $C_{1-22}$ alkyl esters of (meth)acrylic acid, $C_{2-18}$ alkoxyalkyl esters of (meth)acrylic acid, amino acrylic monomers, acrylamide monomers, epoxy-containing monomers, carboxyl-containing monomers, monomers having both isocyanate group(s) and polymerizable unsaturated group(s) in the same molecule, etc. Specific examples of such monomers are as mentioned above as examples of monomers other than hydroxyl-containing monomers in the hydroxyl-containing acrylic resin.

Examples of monomers other than maleimide group-containing monomer (a) also include hydroxyl-containing monomers having one or more hydroxyl groups and one or more polymerizable unsaturated bonds per molecule, such as monoesterification products of glycols having 2 to 20 carbon atoms with (meth)acrylic acid. Specific examples thereof are hydroxyethyl(meth)acrylate, hydroxypropyl(meth)acrylate, hydroxybutyl(meth)acrylate, etc.

Further examples of monomers other than maleimide group-containing monomer (a) include styrene, α-methylstyrene, vinyltoluene, acrylonitrile, vinyl acetate, vinyl chloride, "Veova 9" and "Veova 10" (trade names; products of Japan Epoxy Resins Co., Ltd.; unsaturated vinylation products of versatic acid), etc.

Such monomers other than maleimide group-containing monomer (a) may be used singly or in combination of two or more.

Furthermore, maleimide group-containing copolymer (B) may be a copolymer having unsaturated group(s) introduced into the copolymer obtained by radical copolymerization of a maleimide group-containing monomer (a) with other monomer(s).

Methods for the introduction of such unsaturated groups are, for example, those described in (1) to (4) below. The above-mentioned monomers may be used in these methods.

(1) A method wherein a copolymer is obtained by radical copolymerization of a maleimide group-containing monomer (a) with other monomer(s) including hydroxyl-containing monomer(s), and thereafter a monomer having both isocyanate group(s) and polymerizable unsaturated group(s) in the same molecule is added to all or some of the hydroxyl groups of the copolymer by urethanation reaction.

(2) A method wherein a copolymer is obtained by radical copolymerization of a monomer having both isocyanate group(s) and polymerizable unsaturated group(s) in the same molecule, a maleimide group-containing monomer (a), and other monomer(s); and thereafter a hydroxyl-containing monomer is added to all or some of the isocyanate groups of the copolymer by urethanation reaction.

(3) A method wherein a copolymer is obtained by radical copolymerization of a maleimide group-containing monomer (a) with other monomer(s) including epoxy-containing monomer(s), and thereafter a carboxyl-containing monomer is added to all or some of the epoxy groups of the copolymer by acid-epoxy reaction.

(4) A method wherein a copolymer is obtained by radical copolymerization of a maleimide group-containing monomer (a) with other monomer(s) including carboxyl-containing monomer(s), and thereafter an epoxy-containing monomer is added to all or some of the carboxyl groups of the copolymer by acid-epoxy reaction.

A copolymer (B) can be synthesized by radical copolymerization of a maleimide group-containing monomer (a) with other monomer(s) in the presence of a radical polymerization initiator, and optionally introducing unsaturated bond(s) into the copolymer. Polymerization can be carried out by methods such as block polymerization, suspension polymerization or emulsion polymerization in an aqueous medium, solution polymerization in an organic solvent, etc.

In the synthesis of a copolymer (B), the proportions of the maleimide group-containing monomer (a) and the other monomer(s) are preferably in the range of about 1% to about 50% by weight of the maleimide group-containing monomer (a) and about 99% to about 50% by weight of the other monomer(s), based on the total monomer solids weight.

Examples of radical polymerization initiators include peroxides such as diisopropyl peroxydicarbonate, tert-butyl peroxypivalate, benzoyl peroxide, lauryl peroxide, etc.; azo compounds such as azobisisobutyronitrile, azobisisovaleronitrile, etc.; inorganic peroxides such as ammonium persulfate, potassium persulfate, etc.; and so on. The amount of radical polymerization initiator is preferably about 0.1% to about 10% by weight relative to the total monomer weight.

The copolymer (B) preferably has a number average molecular weight of about 1,000 to about 1,000,000. When used as an organic solution-soluble polymer for coating composition, the copolymer (B) more preferably has a number average molecular weight of about 3,000 to about 30,000. When emulsified/suspended in an aqueous medium for use, the copolymer (B) more preferably has a number average molecular weight of about 10,000 to about 500,000.

Curing Agent (C)

The curing agent (C) is a compound that undergoes a crosslinking reaction with the hydroxyl groups of the hydroxyl-containing resin (A) and the thermosetting functional groups of the compound (D).

Examples of such curing agents (C) include polyisocyanate compounds, melamine resins, guanamine resins, urea resins, etc.

To obtain a coating film having excellent properties in terms of mar resistance, hardness, adhesion, etc., it is preferable to use a polyisocyanate compound alone or in combination with a melamine resin. When a polyisocyanate compound and a melamine resin are used in combination, the polyisocyanate compound/melamine resin weight ratio is within the range of about 10/90 to about 90/10 on a solids basis, depending on the desired properties.

The polyisocyanate is a compound having two or more free isocyanate groups per molecule. Examples thereof include aliphatic diisocyanates such as hexamethylene diisocyanate, trimethyl hexamethylene diisocyanate, dimer acid diisocyanate, lysine diisocyanate, and the like; alicyclic diisocyanates such as hydrogenated xylylene diisocyanate, cyclohexylene diisocyanate, methylenebis(cyclohexyl isocyanate), isophorone diisocyanate, and the like; aromatic diisocyanates such as tolylene diisocyanate, phenylene diisocyanate, 4,4'-diphenylmethane diisocyanate, xylylene diisocyanate, tetramethylxylylene diisocyanate, naphthalene diisocyanate, and the like; trivalent or higher organic polyisocyanates such as 2-isocyanatoethyl-2,6-diisocyanatocaproate, 3-isocyanatomethyl-1,6-hexamethylene diisocyanate, 4-isocyanatomethyl-1,8-octamethylene diisocyanate (commonly referred to as triaminononane triisocyanate), and the like; etc.

Other usable polyisocyanate compounds are dimers and trimers of the above polyisocyanate compounds; prepolymers formed by the urethanation reaction of polyisocyanate compounds with polyhydric alcohols, low-molecular-weight polyester resins, water, etc. under the condition of an excess of isocyanate groups; and so on.

Blocked polyisocyanate compounds wherein the isocyanate groups of the above polyisocyanate compounds are blocked by a blocking agent may be used. Examples of blocking agents include phenols, oximes, lactams, alcohols, mercaptans, activated methylene compounds such as diethyl malonate, etc. When a blocked polyisocyanate compound is used, it is preferably used in combination with a catalyst for the dissociation of the blocking agent.

Unblocked polyisocyanate compounds and blocked polyisocyanate compounds may be used in combination.

A preferable melamine resin is, for example, obtained by etherifying methylol groups in a methylolated melamine with a monoalcohol having 1 to 8 carbon atoms. In the etherified melamine resin, all the methylol groups in the methylolated melamine may be etherified, or they may be partially etherified with some methylol groups or imino groups remaining. The melamine resin preferably has about 1 to about 5 triazine rings and a number average molecular weight of about 300 to about 2,000.

Examples of etherified melamine resins include alkyl-etherified melamines such as methyl-etherified melamines, ethyl-etherified melamines, butyl-etherified melamines, etc.

Such etherified melamine resins may be used singly or in combination of two or more.

Unsaturated Compound (D)

Compound (D) is at least one unsaturated compound selected from the group consisting of radical polymerizable unsaturated monomers, radical polymerizable unsaturated group-containing resins, and radical polymerizable unsaturated group- and thermosetting functional group-containing resins.

A radical polymerizable unsaturated monomer has one or more radical polymerizable unsaturated groups per molecule. Examples of such monomers that may be used are monofunctional polymerizable monomers having one radical polymerizable unsaturated group per molecule, bifunctional polymerizable monomers having two radical polymerizable unsaturated groups per molecule, and polyfunctional polymerizable monomers having three or more radical polymerizable unsaturated groups per molecule. Specific examples thereof are given below.

Examples of monofunctional polymerizable monomers include styrene, methyl(meth)acrylate, ethyl(meth)acrylate, butyl(meth)acrylate, 2-ethylhexyl(meth)acrylate, lauryl (meth)acrylate, cyclohexyl(meth)acrylate, cyclohexenyl (meth)acrylate, 2-hydroxyl(meth)acrylate, hydroxypropyl (meth)acrylate, tetrahydrofurfuryl(meth)acrylate, ε-caprolactone-modified tetrahydrofurfuryl(meth)acrylate, phenoxyethyl(meth)acrylate, phenoxy polyethylene glycol (meth)acrylate, dicyclopentenyl(meth)acrylate, dicyclopentenyloxyethyl(meth)acrylate, isobornyl(meth)acrylate, benzyl(meth)acrylate, ε-caprolactone-modified hydroxyethyl (meth)acrylate, polyethylene glycol mono(meth)acrylate, polypropylene glycol mono(meth)acrylate, 2-hydroxy-3-phenoxypropyl(meth)acrylate, 2-hydroxy-3-butoxypropyl (meth)acrylate, phthalic acid monohydroxyethyl(meth)acrylate, para-cumylphenol ethylene oxide-modified (meth) acrylate, N-methylol(meth)acrylamide, N-methylol(meth) acrylamide butyl ether, acryloyl morpholine, dimethylaminoethyl(meth)acrylate, N-vinyl-2-pyrrolidone, etc.

Examples of bifunctional polymerizable monomers include ethylene glycol di(meth)acrylate, diethylene glycol di(meth)acrylate, polyethylene glycol di(meth)acrylate, propylene glycol di(meth)acrylate, dipropylene glycol di(meth) acrylate, polypropylene glycol di(meth)acrylate, neopentyl glycol di(meth)acrylate, 1,4-butanediol di(meth)acrylate, 1,6-hexanediol di(meth)acrylate, bisphenol-A ethylene oxide-modified di(meth)acrylate, bisphenol-A propylene oxide-modified di(meth)acrylate, 2-hydroxy-1-acryloxy-3-methacryloxypropane, tricyclodecane dimethanol di(meth) acrylate, di(meth)acryloyloxyethyl acid phosphate, etc. Usable bifunctional monomers include those monomers that are commercially available under the trade names of "KAYARAD HX-220", "KAYARAD HX-620", "KAYARAD R-604" (di(meth)acrylate monomers; products of Nippon Kayaku Co., Ltd.), etc.

Examples of polyfunctional polymerizable monomers having three or more radical polymerizable unsaturated groups per molecule include trimethylolpropane tri(meth)acrylate, trimethylolpropane ethylene oxide-modified tri(meth)acrylate, trimethylolpropane propylene oxide-modified tri(meth)acrylate, glycerin tri(meth)acrylate, glycerin ethylene oxide-modified tri(meth)acrylate, glycerin propylene oxide-modified tri(meth)acrylate, pentaerythritol tri(meth)acrylate, pentaerythritol tetra(meth)acrylate, isocyanuric acid ethylene oxide-modified triacrylate, dipentaerythritol hexa(meth)acrylate, etc.

To enhance the curability of the coating composition, mar resistance of the cured coating film, etc., it is preferable to use bifunctional or higher radical polymerizable unsaturated monomers.

Examples of radical polymerizable unsaturated group-containing resins include unsaturated acrylic resins, unsaturated urethane resins, unsaturated epoxy resins, polyester (meth)acrylates, unsaturated silicone resins, etc.

A radical polymerizable unsaturated group- and thermosetting functional group-containing resin has one or more radical polymerizable unsaturated groups and one or more thermosetting functional groups per molecule. To improve the curability of the coating composition, the resin preferably contains two or more radical polymerizable unsaturated groups and two or more thermosetting functional groups per molecule. Examples of thermosetting functional groups include hydroxyl groups, acid groups, epoxy groups, isocyanate groups, and like functional groups. Examples of acid groups include carboxyl groups, phosphoric acid groups, etc.

Examples of resins containing radical polymerizable unsaturated groups and thermosetting functional groups include radical polymerizable unsaturated group- and hydroxyl group-containing acrylic resins, radical polymerizable unsaturated group- and carboxyl group-containing acrylic resins, radical polymerizable unsaturated group- and epoxy group-containing acrylic resins, radical polymerizable unsaturated group- and isocyanate group-containing acrylic resins, radical polymerizable unsaturated group- and hydroxyl group-containing polyester resins, radical polymerizable unsaturated group- and carboxyl group-containing polyester resins, radical polymerizable unsaturated group- and epoxy group-containing cresol novolac epoxy resins, etc.

In the thermosetting and photocurable coating composition (I) of the present invention, the proportions of hydroxyl-containing resin (A), copolymer (B), and curing agent (C) may be selected from a wide range. To obtain excellent properties in terms of the curability of the coating composition, mar resistance of the coating film, etc., the coating composition (I) preferably comprises about 20% to about 60% by weight of hydroxyl-containing resin (A), about 10% to about 45% by weight of copolymer (B), and about 5% to about 50% by weight of curing agent (C) based on the total solids weight of hydroxyl-containing resin (A), copolymer (B), and curing agent (C). More preferably, the coating composition (I) comprises about 30% to about 55% by weight of hydroxyl-containing resin (A), about 20% to about 40% by weight of copolymer (B), and about 10% to about 40% by weight of curing agent (C) based on the total solids weight of hydroxyl-containing resin (A), copolymer (B), and curing agent (C).

The proportion of unsaturated compound (D) is preferably in the range of about 1 to about 50 parts by weight, and more preferably in the range of about 1 to about 30 parts by weight, per 100 parts by weight of the total solids content of hydroxyl-containing resin (A), copolymer (B), and curing agent (C). A proportion of unsaturated compound (D) that is greater than 50 parts by weight is undesirable in that it results in impaired stability of the coating composition as well as poor adhesion of a coating film.

Thermosetting and Photocurable Coating Composition (II)

Thermosetting and photocurable coating composition (II) comprises: (A) a hydroxyl-containing resin; (C) a curing agent; and (E) a maleimide compound. Those hydroxyl-containing resins (A) and curing agents (C) that can be used for the above coating compositions (I) can be used for coating compositions (II).

Maleimide Compound (E)

The maleimide compound (E) is a maleimide group-containing polyether bismaleimide acetic acid ester compound represented by formula (2):

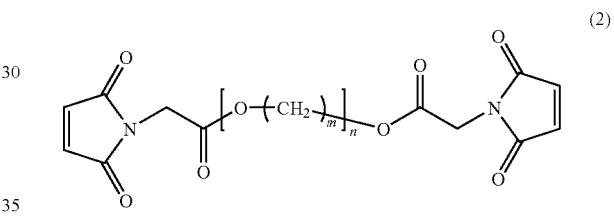

wherein m is an integer from 1 to 6, n is an integer from 1 to 17, and the maleimide compound (E) has a number average molecular weight of 2,000 or less.

To enhance the curability of the coating composition, hardness of the resulting coating film, etc., the above maleimide compound (E) having a number average molecular weight of 2,000 or less is used. The maleimide compound (E) preferably has a number average molecular weight of about 500 to about 1,800.

The use of the maleimide compound (E) in the coating composition (II) enables the formation of a cured coating film by ultraviolet irradiation with little or no photopolymerization initiator added.

When such a maleimide compound (E) is incorporated in, for example, clear coating compositions, and, in particular, top clear coating compositions for automobile bodies or automobile body parts, coating film properties such as mar resistance (including resistance to marring by car washes), scratch resistance, gasoline resistance, adhesion, etc. can be improved without impairing the transparency of the resulting coating film.

For example, "LUMICURE MIA 200" (trade name; product of Dainippon Ink and Chemicals, Inc.; ultraviolet-curable oligomer) may be used as maleimide compound (E).

In the thermosetting and photocurable coating composition (II) of the present invention, the proportions of hydroxyl-containing resin (A) and curing agent (C) may be selected from a wide range. To obtain excellent properties in terms of the curability of the coating composition, mar resistance of the coating film, etc., the coating composition (II) preferably comprises about 60% to about 90% by weight of hydroxyl-containing resin (A) and about 10% to about 40% by weight of curing agent (C) based on the total solids weight of hydroxyl-containing resin (A) and curing agent (C). More preferably, the coating composition (II) comprises about 70% to about 85% by weight of hydroxyl-containing resin (A) and about 15% to about 30% by weight of curing agent (C) based on the total solids weight of hydroxyl-containing resin (A) and curing agent (C).

The proportion of maleimide compound (E) is preferably in the range of about 1 to about 50 parts by weight, and more preferably in the range of about 5 to about 30 parts by weight, per 100 parts by weight of the total solids content of hydroxyl-containing resin (A) and curing agent (C). A proportion of maleimide compound (E) that is greater than 50 parts by weight is undesirable in that it not only fails to improve coating film properties such as mar resistance, scratch resistance, gasoline resistance, adhesion, etc., but also impairs the stability of the coating composition.

Thermosetting and Photocurable Coating Composition (III)

Thermosetting and photocurable coating composition (III) comprises: (A) a hydroxyl-containing resin; (B) a copolymer; (C) a curing agent; and (E) a maleimide compound. In each component, what can be used for the above coating compositions (I) and (II) can be used for coating composition (III).

The use of copolymer (B) and maleimide compound (E) in combination enables the formation of cured coating films with improved film properties in mar resistance, scratch resistance, gasoline resistance, adhesion, etc. on a coating line under the conditions of limited light irradiation amount and limited heating time.

In the thermosetting and photocurable coating composition (III) of the present invention, the proportions of hydroxyl-containing resin (A), copolymer (B), and curing agent (C) may be selected from a wide range. To obtain excellent properties in terms of the stability of the coating composition, etc., the coating composition (III) preferably comprises about 20% to about 60% by weight of hydroxyl-containing resin (A), about 10% to about 45% by weight of copolymer (B), and about 5% to about 50% by weight of curing agent (C) based on the total solids weight of hydroxyl-containing resin (A), copolymer (B), and curing agent (C). More preferably, the coating composition (III) comprises about 30% to about 55% by weight of hydroxyl-containing resin (A), about 20% to about 40% by weight of copolymer (B), and about 10% to about 40% by weight of curing agent (C) based on the total solids weight of hydroxyl-containing resin (A), copolymer (B), and curing agent (C).

The proportion of maleimide compound (E) is usually in the range of about 1 to about 50 parts by weight, and preferably in the range of about 10 to about 30 parts by weight, per 100 parts by weight of the total solids content of hydroxyl-containing resin (A), copolymer (B), and curing agent (C). A proportion of maleimide compound (E) that is greater than 50 parts by weight is undesirable in that it not only fails to improve coating film properties such as mar resistance, scratch resistance, gasoline resistance, adhesion, etc., but also impairs the stability of the coating composition.

The above-described thermosetting and photocurable coating compositions (II) and (III) may further comprise at least one unsaturated compound (D) selected from the group consisting of radical polymerizable unsaturated monomers, radical polymerizable unsaturated group-containing resins, and radical polymerizable unsaturated group- and thermosetting functional group-containing resins.

When unsaturated compound(s) (D) is incorporated in the thermosetting and photocurable coating compositions (II) and (III), the proportion of unsaturated compound (D) is preferably in the range of about 1 to about 50 parts by weight, and more preferably in the range of about 1 to about 30 parts by weight, per 100 parts by weight of the total solids content of hydroxyl-containing resin (A) and curing agent (C) or per 100 parts by weight of the total solids content of hydroxyl-containing resin (A), copolymer (B), and curing agent (C). A proportion of unsaturated compound (D) that is greater than 50 parts by weight is undesirable in that it results in impaired stability of the coating composition as well as poor adhesion of a coating film.

Photopolymerization Initiator (F)

The thermosetting and photocurable coating compositions (I) to (III) of the present invention may optionally contain a photopolymerization initiator (F).

To obtain excellent curability, finish quality, etc., the amount of photopolymerization initiator (F) is preferably in the range of about 0.1 to about 20 parts by weight per 100 parts by weight of the total solids content of hydroxyl-containing resin (A) and curing agent (C) or per 100 parts by weight of the total solids content of hydroxyl-containing resin (A), copolymer (B), and curing agent (C). The amount thereof is more preferably in the range of about 0.2 to about 10 parts by weight, and even more preferably in the range of about 0.3 to about 5 parts by weight, per 100 parts by weight of the total solids content of hydroxyl-containing resin (A) and curing agent (C) or per 100 parts by weight of the total solids content of hydroxyl-containing resin (A), copolymer (B), and curing agent (C).

Examples of photopolymerization initiators include benzoin, benzoin methyl ether, benzoin ethyl ether, benzoin isobutyl ether, diethoxyacetophenone, 2-hydroxy-2-methyl-1-phenylpropane-1-one, benzyl dimethyl ketal, 1-hydroxycyclohexyl-phenylketone, 2-methyl-2-morpholino(4-thiomethylphenyl)propane-1-one, 2-benzyl-2-dimethylamino-1-(4-morpholinophenyl)-butanone, 2,4,6-trimethylbenzoylphenylphosphine oxide, bis(2,4,6-trimethylbenzoyl)-phenylphosphine oxide, 2,4,6-trimethylbenzoylphenylethoxyphosphine oxide, benzophenone, methyl o-benzoylbenzoate, hydroxybenzophenone, 2-isopropylthioxanthone, 2,4-dimethylthioxanthone, 2,4-diethylthioxanthone, 2,4-dichlorothioxanthone, 2,4,6-tris(trichloromethyl)-s-triazine, 2-methyl-4,6-bis(trichloro)-s-triazine, 2-(4-methoxyphenyl)-4,6-bis(trichloromethyl)-s-triazine, etc.

Such photopolymerization initiators may be used singly or in combination of two or more.

The photopolymerization initiators may be used in combination with photosensitizers to accelerate the photopolymerization reaction. Examples of such photosensitizers include tertiary amines such as triethylamine, triethanolamine, methyldiethanolamine, methyl 4-dimethylaminobenzoate, ethyl 4-dimethylaminobenzoate, isoamyl 4-dimethylaminobenzoate, (2-dimethylamino)ethyl benzoate, Michler's ketone, 4,4'-diethylaminobenzophenone, etc.; alkylphosphines such as triphenylphosphine, etc.; thioethers such as β-thiodiglycol, etc.; and so on.

Light Stabilizer

The thermosetting and photocurable coating composition of the present invention may optionally contain a light stabilizer to enhance the weatherability of the coating film. Examples of light stabilizers include hindered amine light stabilizers, which function as radical chain inhibitors to capture active radical species generated in the course of deterioration of a coating film. Light stabilizers may be used in combination with ultraviolet absorbers, which are described later.

Among hindered amine light stabilizers, hindered piperidines are preferable since they have excellent light stabilization properties.

Examples of hindered piperidines are monomeric hindered piperidines such as bis(1,2,2,6,6-pentamethyl-4-piperidyl) sebacate, bis(2,2,6,6-tetramethyl-4-piperidinyl)sebacate, bis (N-methyl-2,2,6,6-tetramethyl-4-piperidinyl)sebacate, 4-benzoyloxy-2,2',6,6'-tetramethylpiperidine, bis(1,2,2,6,6-pentamethyl-4-piperidyl){[3,5-bis(1,1-dimethylethyl)-4-hydroxyphenyl]methyl}butylmalonate, etc.; oligomeric hindered piperidines such as poly{[6-(1,1,3,3-tetramethylbutyl) imino-1,3,5-triazine-2,4-diyl][(2,2,6,6-tetramethyl-4-piperidyl)imino]hexamethylene[(2,2,6,6-tetramethyl-4-piperidyl)iminol]}, etc.; polyester hindered piperidines such as polyesters of 4-hydroxy-2,2,6,6-tetramethyl-1-piperidineethanol and succinic acid, etc.; and so on.

When a light stabilizer is incorporated in the thermosetting and photocurable coating composition of the present invention, the proportion of light stabilizer in the solids content of the coating composition is usually in the range of about 0.1% to about 10% by weight.

Ultraviolet Absorber

The coating composition of the present invention may optionally contain an ultraviolet absorber to increase the weatherability of a coating film. The ultraviolet absorber absorbs incident light and converts light energy into a harmless form like heat energy to inhibit coating film deterioration due to light. Ultraviolet absorbers may be used in combination with the above-described light stabilizers.

Known ultraviolet absorbers may be used. Examples thereof include benzotriazole absorbers, triazine absorbers, salicylic acid derivative absorbers, benzophenone absorbers, etc.

Examples of benzotriazole absorbers include 2-(2'-hydroxy-5'-methylphenyl)benzotriazole, 2-(2'-hydroxy-5'-t-butylphenyl)benzotriazole, 2-(2'-hydroxy-3',5'-di-t-butylphenyl)benzotriazole, 2-(2'-hydroxy-3'-t-butyl-5'-methylphenyl)-5-chlorobenzotriazole, 2-(2'-hydroxy-3',5'-di-t-butylphenyl)-5-chlorobenzotriazole, 2-(2'-hydroxy-3', 5'-di-t-amylphenyl)benzotriazole, 2-(2'-hydroxy-4'-octoxyphenyl)benzotriazole, 2-{2'-hydroxy-3'-(3",4",5",6"-tetrahydrophthalimidemethyl)-5'-methylphenyl}benzotriazole, etc.

Examples of triazine absorbers include 2,4-bis(2,4-dimethylphenyl)-6-(2-hydroxy-4-isooctyloxyphenyl)-1,3,5-triazine, 2-[4((2-hydroxy-3-dodecyloxypropyl)-oxy)-2-hydroxyphenyl]-4,6-bis(2,4-dimethylphenyl)-1,3,5-triazine, 2-[4-((2-hydroxy-3-tridecyloxypropyl)-oxy)-2-hydroxyphenyl]-4,6-bis(2,4-dimethylphenyl)-1,3,5-triazine, 2-(2,4-dihydroxyphenyl)-4,6-bis(2,4-dimethylphenyl)-1,3,5-triazine, etc.

Examples of salicylic acid derivative absorbers include phenyl salicylate, p-octylphenylsalicylate, 4-tert-butylphenylsalicylate, etc.

Examples of benzophenone absorbers include 4-dihydroxybenzophenone, 2-hydroxy-4-methoxybenzophenone, 2,2'-dihydroxy-4-methoxybenzophenone, 2-hydroxy-4-methoxy-2'-carboxybenzophenone, 2-hydroxy-4-methoxy-5-sulfobenzophenone trihydrate, 2,2'-dihydroxy-4,4'-dimethoxybenzophenone, 2-hydroxy-4-octoxybenzophenone, 2-hydroxy-4-octadecyloxybenzophenone, sodium 2,2'-dihydroxy-4,4'-dimethoxy-5-sulfobenzophenone, 2,2',4,4'-tetrahydroxybenzophenone, 4-dodecyloxy-2-hydroxybenzophenone, 5-chloro-2-hydroxybenzophenone, resorcinol monobenzoate, 2,4-dibenzoyl resorcinol, 4,6-dibenzoyl resorcinol, hydroxydodecylbenzophenone, 2,2'-dihydroxy-4-(3-methacryloyl-2-hydroxypropoxy)benzophenone, etc.

When an ultraviolet absorber is incorporated in the thermosetting and photocurable coating composition of the invention, the proportion of ultraviolet absorber in the solids content of the coating composition is usually in the range of about 0.1% to about 10% by weight.

When the coating composition of the present invention is a clear coating composition, it may contain coloring pigment and/or luster pigment to the extent that the transparency of the resulting coating film is not impaired. When the coating composition of the invention is a colored coating composition, it may contain coloring pigment and/or luster pigment so as to produce the intended color tone. The coating composition of the invention may optionally contain other pigments such as extender pigments.

Examples of coloring pigments include inorganic pigments such as titanium dioxide, iron oxides, etc.; organic pigments such as phthalocyanine blue, quinacridone red, perylene red, phthalocyanine green, etc.; and so on. Examples of luster pigments include aluminum flakes, mica flakes, etc. Examples of extender pigments include barium sulfate, calcium carbonate, talc, clay, etc.

If necessary, known additives such as surface modifiers, anti-sagging agents, anti-settling agents, plasticizers, etc. may be added to the coating composition of the invention.

Because of its excellent coating film surface properties, the coating composition of the present invention is preferably used as a clear coating composition to form a top clear coat on automobile bodies or automobile body parts.

Method of Preparing Coating Composition

The thermosetting and photocurable coating composition of the present invention can be prepared by mixing the above-described components according to known methods. When resins are in forms such as organic-solvent solutions, emulsions, etc., they can be mixed as they are. When pigments are used, they may be mixed with dispersion resins to be used in paste form. When mixing components together, organic solvent, water, or a liquid mixture of these may be optionally added to the components.

Examples of organic solvents that may be used in the coating composition of the present invention include aromatic solvents such as toluene, xylene, etc.; ester solvents such as ethyl acetate, propyl acetate, butyl acetate, methoxybutyl acetate, amyl acetate, methyl cellosolve acetate, cellosolve acetate, diethylene glycol monomethyl ether acetate, carbitol acetate, etc.; ether solvents such as dioxane, ethylene glycol diethyl ether, ethylene glycol dibutyl ether, etc.; ketone solvents such as acetone, methyl ethyl ketone, methyl isobutyl ketone, etc.; and so on. Such organic solvents may be used singly or in combination of two or more.

The coating composition of the present invention may be in the form of an organic solvent-based coating composition or an aqueous coating composition. The coating composition usually has a solids content of about 20% to about 80% by weight.

Method of Forming a Coating Film

The thermosetting and photocurable coating composition of the present invention can be suitably used in various methods of forming a coating film on a substrate, as described hereinafter.

Substrate to be Coated

Examples of substrates to be coated include the bodies and body parts of vehicles such as automobiles, motorcycles, etc. Other examples of substrates to be coated are materials for vehicle body components and the like, including metal substrates such as aluminum sheets and plates, aluminum alloy sheets and plates, steel sheets and plates such as cold-rolled steel sheets and plates, galvanized steel sheets and plates, zinc alloy-plated steel sheets and plates, stainless steel sheets and plates, tin-plated steel sheets and plates, etc.; various plastic substrates; and so on.

Such vehicle bodies, body parts, and metal substrates to be coated may have metal surfaces chemically treated by phosphating, chromating, etc. Further, such vehicle bodies, metal substrates, etc. to be coated may have an undercoating film, which is formed from electrodeposition coating compositions, etc., and/or an intermediate coating film.

Methods of Coating and Curing

The coating method using the coating composition of the present invention is not limited. A wet coating film can be formed by methods such as air spray coating, airless spray coating, rotary atomization coating, curtain coating, etc. In air spray coating, airless spray coating, and rotary atomization coating, an electrostatic charge may be optionally applied. Of such methods, air spray coating, rotary atomization coating, etc. are preferable. The coating composition is preferably applied to a film thickness of about 10 to about 70 µm (when cured).

In air spray coating, airless spray coating, and rotary atomization coating, it is preferable to carry out dilution with organic solvent and/or water so as to adjust the viscosity of the coating composition to a suitable range for the coating method, the viscosity being usually within the range of about 15 to about 60 seconds at 20° C. (viscometer: Ford cup No. 4).

After coating a substrate with the coating composition, the resulting wet coating film is cured by irradiating with light after heating or by heating after irradiating with light.

Heating can be performed by known heating means. Examples thereof include drying furnaces such as hot air furnaces, electric furnaces, infrared heating furnaces, etc.

The heating temperature is usually within the range of about 50° C. to about 200° C., and preferably within the range of about 70° C. to about 160° C. The heating time is usually within the range of about 5 to about 30 minutes.

Light irradiation is usually performed using ultraviolet light having a wavelength of about 200 to about 450 nm. The light source can be suitably selected to provide wavelengths to which a selected photopolymerization initiator is highly sensitive. Examples of sources of the above-mentioned ultraviolet light include high pressure mercury lamps, ultrahigh pressure mercury lamps, xenon lamps, carbon arc lamps, metal halide lamps, sunlight, etc.

The coating film is irradiated with ultraviolet light at an intensity of preferably about 100 to about 5,000 mJ/cm$^2$, and more preferably about 300 to about 3,000 mJ/cm$^2$. The irradiation time is usually about 3 seconds to about 3 minutes.

As described above, the wet coating film can be sufficiently cured by first heating and thereafter irradiating with light or by first irradiating with light and thereafter heating.

Therefore, in the heat-curing step combined with the photocuring step on an automobile body coating line, the coating film can be cured as necessary by, for example, heating at about 140° C. for about 20 minutes. When the conveyor speed is 3 m/min, the required length of a drying furnace line can be reduced to about 60 m, which is about half the length usually required. Space and energy thus can be saved.

Steps of Forming a Coating Film

The coating composition of the present invention is capable of forming a coating film having excellent properties in terms of mar resistance, scratch resistance, gasoline resistance, adhesion, etc. Therefore, the coating composition of the invention is preferably used as a clear coating composition to form a top clear coat in a method for forming a multilayer coating film on a substrate. In particular, the coating composition of the invention is preferably used as a clear coating composition for automobile bodies or automobile body parts.

The coating film formation method of the present invention comprises forming one or two colored base coats and then one or two clear coats on a substrate to be coated to form a multilayer coating film, the top clear coat being formed from the coating composition (I), (II), or (III) of the invention.

Especially preferable substrates to be coated by the coating film formation method of the present invention are automobile bodies or automobile body parts.

More specifically, the coating film formation method of the present invention may be, for example, any of the following multilayer coating film formation methods (a) to (c), wherein the top clear coat is formed from the clear coating composition (I), (II), or (III) of the invention.

Method (a): a two-coat method of forming a multilayer coating film, wherein a colored base coat and a top clear coat are formed on a substrate to be coated.

Method (b): a three-coat method of forming a multilayer coating film, wherein a colored base coat, a clear coat, and a top clear coat are formed in that order on a substrate to be coated.

Method (c): a three-coat method of forming a multilayer coating film, wherein a first colored base coat, a second colored base coat, and a top clear coat are formed in that order on a substrate to be coated.

Moreover, the coating composition of the present invention can also be used when forming a single-layer coating film. In this case, the coating composition may be a clear coating composition or may be a colored coating composition. Method (d), which is a film formation method to be used in this case, is described below in addition to the above methods.

Method (d): a one-coat method of forming a coating film, wherein a substrate is coated with the coating composition of the present invention in a single layer, and the coating composition is cured.

The steps of forming a coating film in methods (a), (b), (c), and (d) are described below in detail.

In the above method (a), known colored coating compositions and known lustrous coating compositions may be used as coating compositions for forming the colored base coat.

The colored base coating composition is an organic solvent-based or aqueous coating composition containing a base resin, crosslinking agent, and coloring pigment and/or luster pigment.

Examples of base resins include acrylic resins, vinyl resins, polyester resins, alkyd resins, urethane resins, etc.; and at least one base resin is used. The base resin has crosslinkable functional groups such as hydroxyl groups, epoxy groups, carboxyl groups, alkoxysilyl groups, etc. Examples of crosslinking agents include alkyl-etherified melamine resins, urea resins, guanamine resins, polyisocyanate compounds, blocked polyisocyanate compounds, epoxy compounds, carboxyl-containing compounds, etc.; and at least one crosslinking agent is used. The proportions of base resin and crosslinking agent are preferably 50% to 90% by weight of base resin and 50% to 10% by weight of crosslinking agent, based on the total amount of these components.

Examples of coloring pigments and luster pigments are those previously mentioned as pigments usable for the coating composition of the present invention.

In each method, the coating with colored base coating compositions and clear coating compositions may be carried out using coating methods such as airless spray coating, air spray coating, rotary atomization coating, etc. In these coating methods, an electrostatic charge may be optionally applied.

In method (a), the substrate is coated with a colored base coating composition to a film thickness of about 10 to about 50 μm (when cured). After coating, the base coating composition is either cured by heating at about 100° C. to about 180° C., and preferably at about 120° C. to about 160° C., for about 10 to about 40 minutes, or is not cured with the coated substrate being left to stand at room temperature for several minutes or being preheated at about 40° C. to about 100° C. for about 1 to about 20 minutes.

To form a top clear coat, the coated substrate is further coated with the clear coating composition of the present invention to a film thickness of about 10 to about 70 μm (when cured). The coated substrate is then either first heated and thereafter irradiated with light, or is first irradiated with light and thereafter heated. Thus a cured multilayer coating film can be formed. Preferably, heating is performed at about 100° C. to about 180° C., particularly at about 120° C. to about 160° C., for about 5 to about 30 minutes to cure the coating film by crosslinking. Light irradiation is performed under the above-described conditions of wavelength, light source, irradiation intensity, and irradiation time.

Hereinafter, the method of applying a base coating composition, thereafter applying a clear coating composition without heat-curing the base coat, and curing the two coats simultaneously may be referred to as a two-coat one-bake method. The method of applying a base coating composition, heat-curing the base coat, thereafter applying a clear coating composition, and curing the clear coat may be referred to as a two-coat two-bake method.

The above-described colored base coating composition for method (a) can be used as the colored base coating composition for method (b). Any coating composition for forming a clear coating film can be used as the first clear coating composition to form a clear coat. For example, coating compositions that contain little or no pigment used in known colored base coating compositions can be used. The coating composition of the present invention is used as the second clear coating composition to form a top clear coat. In addition, the clear coating composition of the invention may also be used as the first clear coating composition, so that both the clear coat and the top clear coat are formed from the clear coating composition of the invention.

In method (b), as in method (a), a colored base coating composition is applied to the substrate and either cured by heating, or not cured with the coated substrate being left to stand at room temperature for several minutes or being preheated. The colored base coating film is then coated with a first clear coating composition to a film thickness of about 10 to about 50 μm (when cured). The coating composition is either cured by heating at about 100° C. to about 180° C., and preferably at about 120° C. to about 160° C., for about 10 to about 40 minutes, or is not cured with the coated substrate being left to stand at room temperature for several minutes or being preheated.

The coated substrate is then further coated with the coating composition of the present invention as a second clear coating composition to a coating film thickness of about 10 to about 50 μm (when cured). The coated substrate is then either first heated and thereafter irradiated with light, or is first irradiated with light and thereafter heated. Thus a cured multilayer coating film can be formed. The conditions for heating and irradiation are the same as in method (a).

Hereinafter, the method of applying a base coating composition, applying a first clear coating composition without heat-curing the base coating composition, applying a second clear coating composition without curing the first clear coating composition, and then curing the three coats simultaneously may be referred to as a three-coat one-bake method. The method of applying a base coating composition, applying a first clear coating composition without heat-curing the base coating composition, curing these coats simultaneously, and then applying and curing a second clear coating composition may be referred to as a three-coat two-bake method. Moreover, the method of applying and heat-curing a base coating composition, applying and curing a first clear coating composition, and then applying and curing a second clear coating composition may be referred to as a three-coat three-bake method.

The above-described colored base coating composition for method (a) can be used as the first colored base coating composition for method (c). Since the second colored base coating composition is applied onto the coat of the first colored base coating composition, the second colored base coating composition is usually a clear colored composition that has weak hiding power such that the color tone of the first colored coating surface is visible through the second colored base coating film.

Hence, the second colored base coating composition is preferably prepared by selecting a suitable type of pigment and adjusting the amount thereof in view of the first colored base coating composition such that the hiding power of the second colored base composition is weaker than that of the first colored base composition. The coating composition of the present invention is used as the clear coating composition for the top clear coat.

In method (c), as in method (a), a first colored base coating composition is applied to the substrate and either cured by heating, or not cured with the coated substrate being left to stand at room temperature for several minutes or being preheated. The first colored base coating film is then coated with the second colored base coating composition to a film thickness of about 10 to about 50 μm (when cured). The coating composition is either cured by heating at about 100° C. to about 180° C., and preferably at about 120° C. to about 160° C., for about 10 to about 40 minutes, or is not cured with the coated substrate being left to stand at room temperature for several minutes or being preheated.

The coated substrate is then further coated with the coating composition of the invention as a top clear coating composition to a film thickness of about 10 to about 50 μm (when cured). The coated substrate is then either first heated and thereafter irradiated with light, or is first irradiated with light and thereafter heated. Thus a cured multilayer coating film can be formed. The conditions for heating and irradiation are the same as in method (a).

Hereinafter, the method of applying a first base coating composition, applying a second base coating composition without heat-curing the first base coating composition, applying a clear coating composition without curing the second base coating composition, and then curing the three coats simultaneously may be referred to as a three-coat one-bake method. The method of applying and heat-curing a first base coating composition, applying a second base coating composition, applying a clear coating composition without curing the second base coating composition, and then curing these coats simultaneously may be referred to as a three-coat two-bake method. Moreover, the method of applying and heat-curing a first base coating composition, applying and curing a second base coating composition, and then applying and curing a clear coating composition may be referred to as a three-coat three-bake method.

In method (d), the substrate is coated with the coating composition of the present invention to a film thickness of about 10 to about 50 μm (when cured) by the same coating method as in method (a). The coated substrate is either first heated and thereafter irradiated with light, or is first irradiated with light and thereafter heated. Thus a cured single-layer coating film can be formed. The conditions for heating and irradiation are the same as in method (a).

EFFECT OF THE INVENTION

The coating composition and the coating film formation method according to the present invention achieve the following remarkable effects.

(1) As compared with conventional thermosetting coating compositions, the thermosetting and photocurable coating composition of the present invention enables shortening of the time to cure a coating film and reduction of the size of coating facilities, etc., thereby contributing to saving space and energy. The coating composition of the invention shortens the time for heat-curing, thereby decreasing $CO_2$, soot, etc.

(2) The coating film after application of the coating composition of the present invention can be fully cured by first heating and thereafter irradiating with light or by first irradiating with light and thereafter heating. Therefore, the coating film obtained by the coating film formation method of the present invention has better film properties in terms of mar resistance, scratch resistance, gasoline resistance, adhesion, etc. than a film cured only by irradiating with light.

(3) Therefore, in particular, when the coating composition of the present invention is used to form a top clear coat on an automobile body or automobile body part, the resulting coating film has remarkably improved film properties in terms of mar resistance (including resistance to marring by car washes), scratch resistance, etc.

BEST MODE FOR CARRYING OUT THE INVENTION

The present invention is described below in more detail with reference to Production Examples, Examples, and Comparative Examples. However, the present invention is not limited to these examples. In the examples, parts and percentages are expressed on a weight basis.

Production of Hydroxyl-Containing Resin (A)

PRODUCTION EXAMPLE 1

Production of Hydroxyl-Containing Polyester Resin (A-1)

"Monomer mixture 1" below was placed into a four-necked flask equipped with a heater, a stirrer, a thermometer, a reflux condenser, and a rectification column, and was heated to 160° C. The contents of the flask were heated from 160° C. to 230° C. over 3 hours, and maintained at 230° C. for 1 hour. The generated condensation water was distilled off via the rectification column. The rectification column was replaced with a water separator, and 5 parts of xylene was added to the contents of the flask. Xylene and remaining condensation water was refluxed, thus further removing water by azeotropy with the xylene.

Two hours after the addition of xylene, acid value measurements were started. When the acid value reached 2 mg KOH/g, the mixture was cooled to 140° C. Phthalic anhydride was then added to the mixture, which was maintained at 140° C. for 2 hours to perform an addition reaction. The reaction mixture was thereafter cooled to terminate the reaction. A mixed solvent of xylene/aromatic component-containing high-boiling petroleum solvent (trade name: "Swasol 1000", product of Cosmo Oil Co., Ltd.,) (weight ratio: 50/50) was further added, giving polyester resin (A-1) with a solids content of 70%. Polyester resin (A-1) had a weight average molecular weight of 28,800 and a hydroxyl value of 157 mg KOH/g.

| "Monomer mixture 1": | |
| --- | --- |
| 1,4-cyclohexanedimethanol | 74 parts |
| Trimethylolpropane | 65 parts |
| 1,4-cyclohexanedicarboxylic acid | 66 parts |
| Adipic acid | 74 parts |
| Dibutyltin dilaurate | 0.5 parts |

PRODUCTION EXAMPLES 2 and 3

Production of Hydroxyl-Containing Polyester Resins (A-2) and (A-3)

Except for using monomer components as shown in Table 1, the procedure of Production Example 1 was repeated to obtain polyester resin (A-2) and polyester resin (A-3), each with a solids content of 70%. Polyester resin (A-2) had a weight average molecular weight of 32,000 and a hydroxyl value of 150 mg KOH/g. Polyester resin (A-3) had a weight average molecular weight of 30,000 and a hydroxyl value of 172 mg KOH/g.

Table 1 shows the monomer components of polyester resins (A-1) to (A-3), and the proportion of alicyclic polybasic acid and/or alicyclic polyhydric alcohol of the monomers in total.

TABLE 1

| | Polyester resin No. | | |
| --- | --- | --- | --- |
| | (A-1) | (A-2) | (A-3) |
| 1,4-cyclohexanedimethanol | 74 | 94 | |
| Trimethylolpropane | 65 | 85 | 65 |
| Neopentyl glycol | | | 53 |
| 1,4-cyclohexanedicarboxylic acid | 66 | 100 | |
| Phthalic anhydride | | | 56 |
| Adipic acid | 74 | | 74 |
| Dibutyltin dilaurate | 0.5 | 0.5 | 0.5 |
| Proportion of alicyclic polybasic acid and/or alicyclic polyhydric alcohol of the monomers in total (%) | 50.2 | 69.0 | 0 |

PRODUCTION EXAMPLE 4

Production of Hydroxyl-Containing Acrylic Resin

Four hundred and eighty parts of butyl acetate was placed into a reaction vessel equipped with a thermometer, a thermostat, a stirrer, a reflux condenser and a dropping funnel, and was heated to 130° C. while feeding nitrogen gas into the reaction vessel. While maintaining the same temperature, a mixed solution of the following monomers and polymerization initiator was added dropwise over 3 hours via the dropping funnel.

| | |
|---|---|
| Styrene | 200 parts |
| Methyl methacrylate | 290 parts |
| Cyclohexyl methacrylate | 250 parts |
| 2-hydroxyethyl methacrylate | 260 parts |
| 2,2'-azobis(2-methylbutyronitrile) | 50 parts |

After completion of the dropwise addition, the mixture was aged at 130° C. for 1 hour, giving a solution of hydroxyl-containing acrylic resin with a resin solids content of 70%. The obtained resin was analyzed by GPC (gel permeation chromatography) with the result that it had a number average molecular weight of about 8,000. The resin had a hydroxyl value of 107 mg KOH/g.

Production of Maleimide Group-Containing Copolymer (B)

PRODUCTION EXAMPLE 5

Production of Copolymer (B-1)

One thousand parts of butyl acetate was placed into a reaction vessel equipped with a thermometer, a thermostat, a stirrer, a reflux condenser and a dropping funnel, and was heated to 120° C. while feeding nitrogen gas into the reaction vessel. While maintaining the same temperature, a mixed solution of the following monomers and polymerization initiator was added dropwise over 3 hours via the dropping funnel.

| | |
|---|---|
| Styrene | 200 parts |
| Methyl methacrylate | 290 parts |
| 2-hydroxyethyl methacrylate | 260 parts |
| 2,2'-azobis (2-methylbutyronitrile) | 30 parts |
| Maleimide group-containing copolymer (a) represented by the formula below | 250 parts |

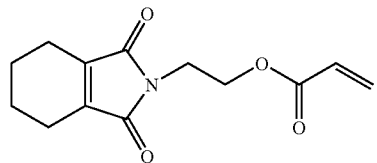

After completion of the dropwise addition, the mixture was aged at 120° C. for 1 hour, giving a maleimide group-containing copolymer (B-1) solution with a resin solids content of 50%. The obtained copolymer was analyzed by GPC (gel permeation chromatography) with the result that it had a number average molecular weight of about 9,000. The copolymer had a hydroxyl value of 107 mg KOH/g.

Production of Clear Coating Composition for Automobile Bodies or Automobile Body Parts

EXAMPLE 1

Forty parts of polyester resin (A-1) obtained in Production Example 1, 10 parts of polyester resin (A-2) obtained in Production Example 2, 20 parts of copolymer (B-1) obtained in Production Example 5, 30 parts of curing agent I (Note 1), 15 parts of maleimide compound (Note 2), and 5 parts of pentaerythritol triacrylate were mixed with stirring. After 1.5 parts of photopolymerization initiator I (Note 3) and 0.5 parts of photopolymerization initiator II (Note 4) were added and dissolved in the mixture, 1 part of ultraviolet absorber (Note 5) and 1 part of light stabilizer (Note 6) were further added and dissolved in the mixture. The resulting mixture was diluted with xylene to adjust its viscosity to 25 seconds at 20° C. (viscometer: Ford cup No. 4), giving clear coating composition No. 1 for automobile bodies or automobile body parts (hereinafter referred to as "for automobiles").

The above (Note 1) to (Note 6) indicate the following:

(Note 1) curing agent I: trade name "Sumidur N-3300", product of Sumika Bayer Urethane Co., Ltd., isocyanurate-modified hexamethylene diisocyanate, solids content: 100%

(Note 2) maleimide compound: trade name "LUMICURE MIA 200", product of Dainippon Ink and Chemicals, Inc., maleimide group-containing ultraviolet-curable oligomer (Note 3) photopolymerization initiator I: trade name "IRGACURE 184", product of Ciba Specialty Chemicals K.K., 1-hydroxy-cyclohexyl-phenyl-ketone (Note 4) photopolymerization initiator II: trade name "IRGACURE 819", product of Ciba Specialty Chemicals K.K., bis(2,4,6-trimethylbenzoyl)-phenylphosphine oxide (Note 5) ultraviolet absorber: trade name "TINUVIN 400", product of Ciba Specialty Chemicals K.K., triazine ultraviolet absorber (Note 6) light stabilizer: trade name "SANOL LS-292", product of Sankyo Co., Ltd., bis(1,2,2,6,6-pentamethyl-4-piperidyl)sebacate

EXAMPLES 2 TO 7

Except for using components as shown in Table 2, the procedure of Example 1 was repeated to obtain clear coating compositions No. 2 to No. 7 for automobiles.

TABLE 2

| | Example | | | | | | |
|---|---|---|---|---|---|---|---|
| | 1 | 2 | 3 | 4 | 5 | 6 | 7 |
| Clear coating composition for automobiles | No. 1 | No. 2 | No. 3 | No. 4 | No. 5 | No. 6 | No. 7 |
| Polyester resin (A-1) | 40 | 30 | 30 | 70 | | | |
| Polyester resin (A-2) | 10 | 15 | 10 | | 70 | | |
| Polyester resin (A-3) | | | | | | 30 | |
| Acrylic resin of Production Ex. 4 | | | | | | | 40 |
| Copolymer (B-1) | 20 | 25 | 30 | | | 40 | 30 |
| Curing agent I (Note 1) | 30 | 25 | 25 | 30 | 30 | 25 | 25 |
| Curing agent II (Note 7) | | | 5 | | | | |
| Curing agent III (Note 8) | | 5 | | | | 5 | 5 |
| Pentaerythritol triacrylate | 5 | | | 10 | | | |
| Dipentaerythritol hexaacrylate | | | 15 | | | | |
| Maleimide compound (Note 2) | 15 | 20 | | | 25 | 25 | 25 | 30 |
| Photopolymerization initiator I (Note 3) | 1.5 | 1 | 2 | 1 | 0.5 | 1 | 1 |
| Photopolymerization initiator II (Note 4) | 0.5 | 0.5 | 0.5 | 1 | 0.5 | 0.5 | 0.5 |
| Ultraviolet absorber (Note 5) | 1 | 0.5 | 1.5 | 1 | 1 | 0.5 | 0.5 |
| Light stabilizer (Note 6) | 1 | 1.5 | 0.5 | 1 | 1 | 1 | 1 |

COMPARATIVE EXAMPLES 1 TO 4

Except for using components as shown in Table 3, the procedure of Example 1 was repeated to obtain comparative clear coating compositions No. 8 to No. 11 for automobiles.

TABLE 3

|  | Comparative Example | | | |
|---|---|---|---|---|
|  | 1 | 2 | 3 | 4 |
| Clear coating composition for automobiles | No. 8 | No. 9 | No. 10 | No. 11 |
| Polyester resin (A-1) |  |  |  |  |
| Polyester resin (A-2) |  |  |  |  |
| Polyester resin (A-3) |  | 70 |  |  |
| Acrylic resin of Production Ex. 4 | 70 |  | 70 |  |
| Copolymer (B-1) |  |  |  |  |
| Curing agent I (Note 1) | 30 | 25 |  |  |
| Curing agent II (Note 7) |  |  | 30 |  |
| Curing agent III (Note 8) |  | 5 |  |  |
| Pentaerythritol triacrylate | 30 |  |  | 60 |
| Dipentaerythritol hexaacrylate |  | 20 |  |  |
| Maleimide compound (Note 2) |  |  |  | 40 |
| Photopolymerization initiator I (Note 3) | 2 | 2 |  | 2 |
| Photopolymerization initiator II (Note 4) | 0.5 | 0.5 |  | 0.5 |
| Ultraviolet absorber (Note 5) | 1 | 1 | 1 | 1 |
| Light stabilizer (Note 6) | 1 | 1 | 1 | 1 |

Tables 2 and 3 show the amounts (parts) of the components of the coating compositions on a solids basis. The acrylic resin in Production Example 4 corresponds to "hydroxyl-containing resin (A)"; and pentaerythritol triacrylate and dipentaerythritol hexaacrylate correspond to "unsaturated compound (D)".

In Tables 2 and 3, (Note 1) to (Note 6) are as indicated above. (Note 7) and (Note 8) indicate the following:

(Note 7) curing agent II: trade name "Cymel 235", product of Mitsui Cytec Ltd., methylated/butylated melamine resin (Note 8) curing agent III: trade name "Cymel 325", product of Mitsui Cytec Ltd., methylated/imino melamine resin

PRODUCTION EXAMPLE 6

Production of Substrate to be Coated

A zinc phosphate-treated galvanized steel sheet (25 cm×25 cm×0.8 mm) was coated with a cationic electrodeposition coating composition (trade name: "Elecron GT-10LF", product of Kansai Paint Co., Ltd.) by electrodeposition to a film thickness of about 20 μm (when cured). The coated sheet was heated at 170° C. for 20 minutes to cure the coating film. The sheet was further coated with a coating composition for an automobile intermediate coat (trade name: "Amilac TP-65-2", product of Kansai Paint Co., Ltd.) by air spraying to a film thickness of about 35 μm (when cured). The coated sheet was heated at 140° C. for 30 minutes to cure the coating film, thus giving a substrate to be coated.

Coating Film Formation Method

EXAMPLE 8

The substrate to be coated obtained in Production Example 6 was coated with an aqueous colored base coating composition (trade name: "WBC-710T (black)", product of Kansai Paint Co., Ltd., acrylic resin/melamine resin thermosetting coating composition) by air spraying to a film thickness of about 15 μm (when cured) and was dried at 80° C. for 10 minutes to evaporate water in the coating film. The resulting uncured coating surface was coated with a clear coating composition (trade name: "Magicron TC-69", product of Kansai Paint Co., Ltd., acrylic resin/melamine resin thermosetting coating composition) by air spraying to a film thickness of about 35 μm (when cured). The coated substrate was heated at 140° C. for 30 minutes to simultaneously cure the base coating film and the clear coating film.

The cured clear coating film was coated with clear coating composition No. 1 for automobiles obtained in Example 1 by air spraying to a film thickness of about 40 μm (when cured). The resulting coating film was dried at 90° C. for 3 minutes as a preheating step to evaporate solvent.

Subsequently, using a metal halide lamp (output: 120 W/cm), the coating film was irradiated with ultraviolet light (wavelength: about 365 nm) for about 10 seconds at an intensity of 1,000 mJ/cm$^2$ for photocuring, and thereafter heated at 140° C. for 5 minutes, thereby being cured.

Thus a multilayer coating film was formed by the three-coat two-bake method.

EXAMPLE 9

A multilayer coating film was formed by the three-coat two-bake method in the same manner as in Example 8 except that clear coating composition No. 2 for automobiles obtained in Example 2 was used in place of clear coating composition No. 1 for automobiles, and that the coating film after photocuring was heated at 140° C. for 10 minutes.

EXAMPLE 10

A multilayer coating film was formed by the three-coat two-bake method in the same manner as in Example 9 except that clear coating composition No. 3 for automobiles obtained in Example 3 was used in place of clear coating composition No. 2 for automobiles.

EXAMPLE 11

A multilayer coating film was formed by the three-coat two-bake method in the same manner as in Example 8 except that clear coating composition No. 4 for automobiles obtained in Example 4 was used in place of clear coating composition No. 1 for automobiles.

EXAMPLE 12

A multilayer coating film was formed by the three-coat two-bake method in the same manner as in Example 8 except that clear coating composition No. 5 for automobiles obtained in Example 5 was used in place of clear coating composition No. 1 for automobiles.

EXAMPLE 13

A multilayer coating film was formed by the three-coat two-bake method in the same manner as in Example 8 except that clear coating composition No. 6 for automobiles was used in place of clear coating composition No. 2 for automobiles.

EXAMPLE 14

A multilayer coating film was formed by the three-coat two-bake method in the same manner as in Example 8 except that clear coating composition No. 7 for automobiles was used in place of clear coating composition No. 2 for automobiles.

EXAMPLE 15

The substrate to be coated obtained in Production Example 6 was coated with an aqueous colored base coating composition (trade name: "WBC-710T (black)", product of Kansai Paint Co., Ltd., acrylic resin/melamine resin thermosetting coating composition) by air spraying to a film thickness of about 15 μm (when cured) and was dried at 80° C. for 10 minutes to evaporate water in the coating film. The resulting uncured coating surface was coated with a clear coating composition (trade name: "Magicron TC-69", product of Kansai Paint Co., Ltd., acrylic resin/melamine resin thermosetting coating composition) by air spraying to a film thickness of about 35 μm (when cured).

The uncured clear coating film was coated with clear coating composition No. 1 for automobiles obtained in Example 1 by air spraying to a film thickness of about 40 μm (when cured). The coated substrate was heated at 140° C. for 30 minutes to cure the colored base coating film and the first clear coating film and semicure the top clear coating film. Subsequently, using a metal halide lamp (output: 120 W/cm), the top clear coating film was sufficiently cured by irradiation with ultraviolet light (wavelength: about 365 nm) for about 10 seconds at an intensity of 1,000 mJ/cm². Thus a multilayer coating film was formed by the three-coat one-bake method.

EXAMPLE 16

The substrate to be coated obtained in Production Example 6 was coated with an aqueous colored base coating composition (trade name: "WBC-710T (black)", product of Kansai Paint Co., Ltd., acrylic resin/melamine resin thermosetting coating composition) by air spraying to a film thickness of about 15 μm (when cured) and was dried at 80° C. for 10 minutes to evaporate water in the coating film. The resulting uncured coating surface was coated with clear coating composition No. 1 for automobiles obtained in Example 1 by air spraying to a film thickness of about 40 μm (when cured). The resulting coating film was dried at 90° C. for 3 minutes as a preheating step to evaporate solvent.

Subsequently, using a metal halide lamp (output: 120 W/cm), the coating film was irradiated with ultraviolet light (wavelength: about 365 nm) for about 10 seconds at an intensity of 1,000 mJ/cm² for photocuring, and thereafter heated at 140° C. for 30 minutes to simultaneously cure the two coats. Thus a multilayer coating film was formed by the two-coat one-bake method.

Table 4 shows the top-coat clear coating compositions for automobiles, coating film formation steps, and film-curing conditions used in the coating film formation methods of Examples 8 to 16.

TABLE 4

| | | Example | | | | | | | | |
|---|---|---|---|---|---|---|---|---|---|---|
| | | 8 | 9 | 10 | 11 | 12 | 13 | 14 | 15 | 16 |
| Clear coating composition for automobiles | | No. 1 | No. 2 | No. 3 | No. 4 | No. 5 | No. 6 | No. 7 | No. 1 | No. 1 |
| Coating film formation steps | | 3C2B | 3C2B | 3C2B | 3C2B | 3C2B | 3C2B | 3C2B | 3C1B | 2C1B |
| Irradiation | Intensity (mJ/cm²) | 1000 | 1000 | 1000 | 1000 | 1000 | 1000 | 1000 | — | 1000 |
| | Time (sec) | 10 | 10 | 10 | 10 | 10 | 10 | 10 | — | 10 |
| Heating | Temperature (° C.) | 140 | 140 | 140 | 140 | 140 | 140 | 140 | 140 | 140 |
| | Time (min) | 5 | 10 | 10 | 5 | 5 | 10 | 10 | 30 | 30 |
| Irradiation | Intensity (mJ/cm²) | — | — | — | — | — | — | — | 1000 | — |
| | Time (sec) | — | — | — | — | — | — | — | 10 | — |

In Table 4, 3C2B, 3C1B, and 2C1B mean three-coat two-bake method, three-coat one-bake method, and two-coat one-bake method, respectively.

COMPARATIVE EXAMPLE 5

A multilayer coating film was formed by the three-coat two-bake method in the same manner as in Example 8 except that clear coating composition No. 8 for automobiles obtained in Comparative Example 1 was used in place of clear coating composition No. 1 for automobiles.

COMPARATIVE EXAMPLE 6

A multilayer coating film was formed by the three-coat two-bake method in the same manner as in Example 9 except that clear coating composition No. 9 for automobiles obtained in Comparative Example 2 was used in place of clear coating composition No. 2 for automobiles.

COMPARATIVE EXAMPLE 7

The substrate to be coated obtained in Production Example 6 was coated with an aqueous colored base coating composition (trade name: "WBC-710T (black)", product of Kansai Paint Co., Ltd., acrylic resin/melamine resin thermosetting coating composition) to a film thickness of about 15 μm (when cured) and was dried at 80° C. for 10 minutes to evaporate water in the coating film. The resulting uncured coating surface was coated with a clear coating composition (trade name: "Magicron TC-69", product of Kansai Paint Co., Ltd., acrylic resin/melamine resin thermosetting coating composition) to a film thickness of about 35 μm (when cured). The coated substrate was heated at 140° C. for 30 minutes to simultaneously cure the base coating film and the clear coating film.

The cured clear coating film was coated with clear coating composition No. 10 for automobiles obtained in Comparative Example 3 by air spraying to a film thickness of about 40 μm (when cured). The resulting coating film was cured only by heating at 140° C. for 5 minutes, without ultraviolet irradiation. Thus a multilayer coating film was formed by a three-coat two-bake method.

COMPARATIVE EXAMPLE 8

The substrate to be coated obtained in Production Example 6 was coated with an aqueous colored base coating composition (trade name: "WBC-710T (black)", product of Kansai Paint Co., Ltd., acrylic resin/melamine resin thermosetting coating composition) to a film thickness of about 15 μm (when cured) and was dried at 80° C. for 10 minutes to evaporate water in the coating film. The resulting uncured coating surface was coated with a clear coating composition (trade name: "Magicron TC-69", product of Kansai Paint Co., Ltd., acrylic resin/melamine resin thermosetting coating composition) to a film thickness of about 35 μm (when cured). The coated substrate was heated at 140° C. for 30 minutes to simultaneously cure the base coating film and the clear coating film.

The cured clear coating film was coated with clear coating composition No. 11 for automobiles obtained in Comparative Example 4 by air spraying to a film thickness of about 40 μm (when cured). The resulting coating film was dried at 90° C. for 3 minutes as a preheating step to evaporate solvent. Subsequently, using a 120 W/cm metal halide lamp, the coating film was irradiated with ultraviolet light (wavelength: about 365 nm) for about 10 seconds at an intensity of 1,000 mJ/cm$^2$ to photocure the coating film. Thus a multilayer coating film was formed by a three-coat two-bake method.

COMPARATIVE EXAMPLE 9

The substrate to be coated obtained in Production Example 6 was coated with an aqueous colored base coating composition (trade name: "WBC-710T (black)", product of Kansai Paint Co., Ltd., acrylic resin/melamine resin thermosetting coating composition) to a film thickness of about 15 μm (when cured) and was dried at 80° C. for 10 minutes to evaporate water in the coating film.

The resulting uncured coating surface was coated with clear coating composition No. 10 for automobiles obtained in Comparative Example 3 by air spraying to a film thickness of about 40 μm (when cured). The resulting coating film was cured only by heating at 140° C. for 30 minutes, without ultraviolet irradiation. Thus a multilayer coating film was formed by a two-coat one-bake method.

Table 5 shows the top-coat clear coating compositions for automobiles, coating film formation steps, and film-curing conditions used in the coating film formation methods of Comparative Examples 5 to 9.

TABLE 5

| | Comparative Example | | | | |
|---|---|---|---|---|---|
| | 5 | 6 | 7 | 8 | 9 |
| Clear coating composition for automobiles | No. 8 | No. 9 | No. 10 | No. 11 | No. 10 |
| Coating film formation steps | 3C2B | 3C2B | 3C2B | 3C2B | 2C1B |
| Irradiation Intensity (mJ/cm$^2$) | 1000 | 1000 | — | 1000 | — |
| Time (sec) | 10 | 10 | — | 10 | — |
| Heating Temperature (° C.) | 140 | 140 | 140 | — | 140 |
| Time (min) | 5 | 10 | 5 | — | 30 |

In Table 5, 3C2B and 2C1B mean three-coat two-bake method and two-coat one-bake method, respectively.

The coated substrates of Examples 8 to 16 and Comparative Examples 5 to 9 were each tested for the properties of the coating films formed thereon, as follows.

Degree of curing of coating film: The coating surface was wiped for 50 reciprocating strokes with a gauze soaked with xylene and was observed with the naked eye to evaluate the degree of curing of the coating film according to the following criteria:

A: No changes occurred on the coating surface. The curing of the coating film was sufficient.

B: The coating surface was marred. The curing of the coating film was insufficient.

C: The coating surface was dissolved by the xylene. The curing of the coating film was extremely insufficient.

Gasoline resistance: After the coated substrate was immersed in regular gasoline at room temperature for 2 hours, the coating surface was observed with the naked eye to evaluate the gasoline resistance of the coating film according to the following criteria:

A: There was no blistering or blushing on the coating surface. The coating film had excellent gasoline resistance.

B: There was a little blistering or blushing on the coating surface. The coating film had somewhat poor gasoline resistance.

C: There was considerable blistering or blushing on the coating surface. The coating film had poor gasoline resistance.

Mar resistance: Polishing sand (trade name: "Daruma cleanser", product of Yamasan-shouten Ltd.) mixed with an equal weight of water was placed on the coated substrate. While being pressed with the flannel-covered tester terminal of a friction tester (product of Suga Test Instruments Co., Ltd., model: FR-2S), the coated substrate was rubbed back and forth for 50 reciprocating strokes under a load of 0.5 kg. The coating surface was observed with the naked eye to evaluate the mar resistance of the coating film according to the following criteria:

A: Little change occurred in the gloss of the coating surface. The coating film had excellent mar resistance.

B. A slight change occurred in the gloss of the coating surface, but to the extent that was allowable for a product.

C: The gloss of the coating surface was impaired. The coating film had poor mar resistance.

C: The gloss of the coating surface was severely impaired. The coating film had very poor mar resistance.

Scratch length: A continuous load-type scratch strength tester (trade name: "Tribogear type 18L", product of Shinto Scientific Co., Ltd.) was used to scratch the coating film of the coated substrate by pulling a scratch needle (made of sapphire, 0.1 mmR) for a distance of 10 cm at a speed of 30 cm/min under a continuous load of 0 g to 100 g. The length (cm) of the scratch left on the coating film 24 hours after the test was measured.

Knoop hardness: After the coated substrate was left in a thermostatic room at 20° C. for 4 hours, measurement was conducted using a Tukon hardness tester (TUKON microhardness tester, product of American Chain & Cable Company).

Adhesion: After the coated substrate was immersed in warm water at 40° C. for 240 hours, the cured coating film was given crosscuts with a cutter reaching down to the substrate so as to form a grid of 100 squares (2 mm×2 mm). Adhesive tape was applied to the surface of the grid portion and forcefully pulled upward. Peeling of the top clear coating film was inspected, counting the number of remaining crosscut squares. A larger number of remaining crosscut squares indicates better adhesion.

The test results are shown in Table 6.

TABLE 6

| | Example | | | | | | | | | Comparative Example | | | | |
|---|---|---|---|---|---|---|---|---|---|---|---|---|---|---|
| | 8 | 9 | 10 | 11 | 12 | 13 | 14 | 15 | 16 | 5 | 6 | 7 | 8 | 9 |
| Degree of curing | A | A | A | A | A | A | A | A | A | A | A | C | A | A |
| Gasoline resistance | A | A | A | A | A | A | A | A | A | A | B | C | A | A |
| Mar resistance | A | A | A | A | A | B | B | A | A | B | B | D | A | C |
| Scratch length | 2 | 3 | 2 | 3 | 3 | 3 | 3 | 2 | 2 | 5 | 6 | 9 | 0 | 7 |
| Knoop hardness | 9 | 8 | 11 | 7 | 7 | 7 | 8 | 9 | 10 | 9 | 5 | 8 | 20 | 8 |
| Adhesion | 100 | 100 | 100 | 100 | 100 | 100 | 100 | 100 | 100 | 80 | 100 | 0 | 0 | 100 |

Table 6 shows that the multilayer coating films obtained in Examples 8 to 16 were sufficiently cured and had excellent properties in terms of gasoline resistance, mar resistance, scratch resistance, Knoop hardness, and adhesion.

The invention claimed is:

1. A thermosetting and photocurable clear coating composition comprising for automobiles:
   (A) a hydroxyl-containing resin;
   (B) a maleimide group-containing copolymer obtained by radical copolymerization of a maleimide group-containing monomer (a) with at least one other monomer;
   (C) a curing agent;
   (D) at least one unsaturated compound selected from the group consisting of radical polymerizable unsaturated monomers, radical polymerizable unsaturated group-containing resins, and radical polymerizable unsaturated group- and thermosetting functional group-containing resins; and
   (F) photopolymerization initiator,
   wherein the hydroxyl-containing resin (A) is a hydroxyl-containing polyester resin produced by esterifying a polybasic acid (b) with a polyhydric alcohol (c), wherein an alicyclic polybasic acid (b1) and an alicyclic polyhydric alcohol (c1) are included in a proportion of 30% to 70% by weight based on the total weight of polybasic acid (b) and polyhydric alcohol (c); and
   wherein the maleimide group-containing monomer (a) of the copolymer (B) is a tetrahydrophthalmaleimide (meth)acrylate represented by formula (1):

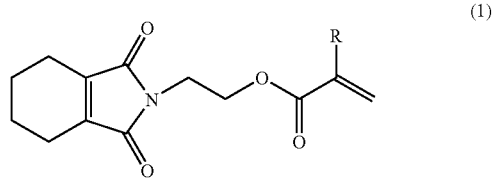

wherein R represents hydrogen atom or methyl group; and
   wherein the amount of photopolymerization initiator (F) is in the range of 0.1 to 20 parts by weight per 100 parts by weight of the total solids content of hydroxyl-containing resin (A), copolymer (B), and curing agent (C).

2. A coating composition according to claim 1, wherein the curing agent (C) is a polyisocyanate compound.

3. A coating composition according to claim 1, wherein the curing agent (C) is a combination of a polyisocyanate compound and a melamine resin.

4. A coating composition according to claim 1, comprising 20% to 60% by weight of hydroxyl-containing resin (A), 10% to 45% by weight of copolymer (B), and 5% to 50% by weight of curing agent (C) based on the total weight of hydroxyl-containing resin (A), copolymer (B), and curing agent (C); and comprising 1 to 50 parts by weight of unsaturated compound (D) per 100 parts by weight of the total of hydroxyl-containing resin (A), copolymer (B), and curing agent (C).

5. A coating composition according to claim 1, wherein the coating composition is a clear coating composition for automobile bodies or automobile body parts.

6. A method of forming a coating film comprising forming one or two colored base coats and one or two clear coats on a substrate to be coated to form a multilayer coating film, the top clear coat being formed from the coating composition of claim 1.

7. A method of forming a coating film according to claim 6, wherein a colored base coat and a top clear coat are formed on the substrate to form a multilayer coating film.

8. A method of forming a coating film according to claim 6, wherein a colored base coat, a clear coat, and a top clear coat are formed on the substrate to form a multilayer coating film.

9. A method of forming a coating film according to claim 6, wherein a first colored base coat, a second colored base coat, and a top clear coat are formed on the substrate to form a multilayer coating film.

10. A method of forming a coating film according to claim 6, wherein the substrate is an automobile body or an automobile body part.

11. An automobile body or an automobile body part having a coating film formed thereon by the method of forming a coating film according to claim 10.

* * * * *